(12) United States Patent
Inoue et al.

(10) Patent No.: US 8,256,787 B2
(45) Date of Patent: Sep. 4, 2012

(54) ADJUSTABLE BICYCLE SUSPENSION SYSTEM

(75) Inventors: Jun Inoue, Osaka (JP); Toyoto Shirai, Izumi (JP)

(73) Assignee: Shimano Inc., Sakai (JP)

( * ) Notice: Subject to any disclaimer, the term of this patent is extended or adjusted under 35 U.S.C. 154(b) by 82 days.

(21) Appl. No.: 12/576,221

(22) Filed: Oct. 8, 2009

(65) Prior Publication Data
US 2011/0084464 A1    Apr. 14, 2011

(51) Int. Cl.
*B62K 21/02* (2006.01)
(52) U.S. Cl. ......................... 280/276; 280/275; 280/279
(58) Field of Classification Search .................. 280/276, 280/275, 279
See application file for complete search history.

(56) References Cited

U.S. PATENT DOCUMENTS

| | | | | |
|---|---|---|---|---|
| 5,478,099 A * | 12/1995 | Kawahara | | 280/276 |
| 5,634,652 A * | 6/1997 | Tsai | | 280/276 |
| 5,634,653 A * | 6/1997 | Browning | | 280/276 |
| 6,105,988 A * | 8/2000 | Turner et al. | | 280/276 |
| 7,011,325 B2 * | 3/2006 | Kinzler et al. | | 280/276 |
| 7,163,223 B2 * | 1/2007 | Wesling et al. | | 280/276 |
| 7,216,881 B2 * | 5/2007 | Wesling | | 280/276 |
| 7,344,147 B2 * | 3/2008 | Chen | | 280/276 |
| 7,401,800 B2 * | 7/2008 | Jordan | | 280/276 |
| 7,722,069 B2 * | 5/2010 | Shirai | | 280/276 |
| 7,806,022 B2 * | 10/2010 | Hara | | 74/502.2 |
| 7,900,947 B2 * | 3/2011 | Inoue | | 280/276 |
| 2001/0004036 A1 * | 6/2001 | Gonzalez et al. | | 188/319.2 |
| 2004/0046354 A1 * | 3/2004 | Turner et al. | | 280/276 |
| 2004/0262879 A1 * | 12/2004 | Kinzler et al. | | 280/276 |
| 2005/0103149 A1 * | 5/2005 | Hunt et al. | | 74/502.2 |
| 2008/0041681 A1 * | 2/2008 | Shipman | | 188/319.2 |
| 2008/0282830 A1 * | 11/2008 | Hara | | 74/489 |
| 2009/0001684 A1 * | 1/2009 | McAndrews et al. | | 280/276 |
| 2011/0012317 A1 * | 1/2011 | Mouri et al. | | 280/5.519 |
| 2011/0062679 A1 * | 3/2011 | Shirai | | 280/276 |

* cited by examiner

*Primary Examiner* — Tashiana Adams
*Assistant Examiner* — Michael Stabley
(74) *Attorney, Agent, or Firm* — Ditthavong Mori & Steiner, P.C.

(57) ABSTRACT

An adjustable bicycle suspension system includes a first stroke adjustment unit and a second stroke adjustment unit. The first stroke adjustment unit is configured to adjust a stroke of a suspension by changing a position of the suspension at a first position or a second position. The second stroke adjustment unit is configured to change the position of the suspension at the second position independently from the first position.

11 Claims, 13 Drawing Sheets

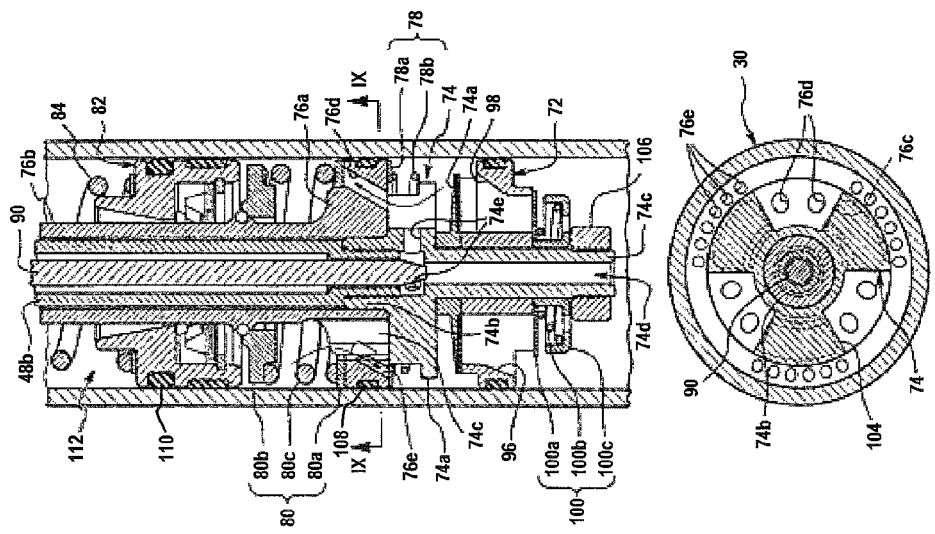
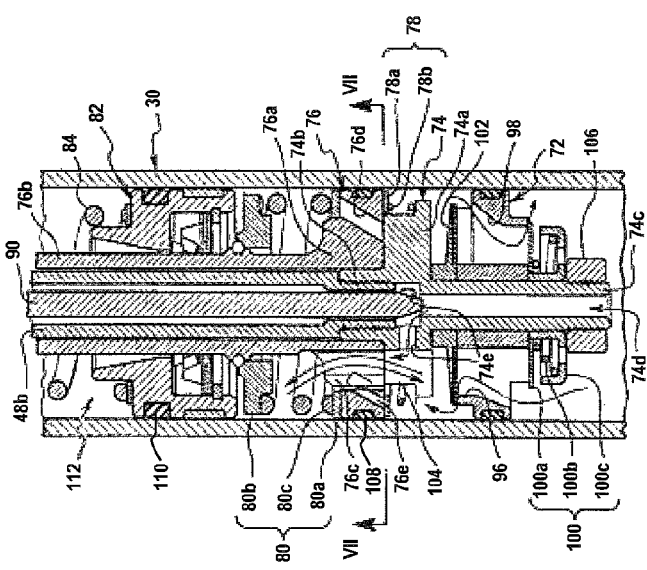
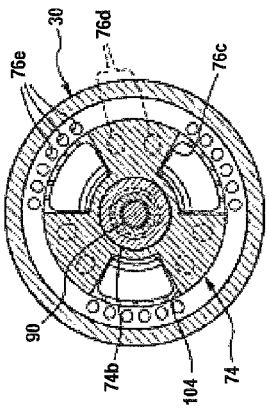

ADJUSTABLE BICYCLE SUSPENSION SYSTEM

BACKGROUND OF THE INVENTION

1. Field of the Invention

The present invention relates to an adjustable bicycle suspension system.

2. Discussion of Background

Bicycling is becoming an increasingly more popular form of recreation, as well as a dependable means of transportation. Moreover, bicycling has become a very popular competitive sport for both amateurs and professionals, alike. Whatever the purpose, the bicycle industry is constantly seeking to improve various components of bicycles. For instance, conventional bicycles had rigid frames and forks without front or rear suspensions and, as a result, transmitted terrain-induced vibrations directly to a rider. More recently, bicycles, such as mountain bikes (MTB) and all-terrain bikes (ATB), have been fit with front and/or rear suspension assemblies configured to substantially absorb terrain-induced vibrations that would otherwise be transmitted to a rider. Depending upon the terrain, however, some riders may find it desirable to quickly adjust or even lockout these suspension assemblies. Even though adjustment units for adjusting suspension assemblies have been introduced, such as in United States Patent Application Publication No. 2005/0103149, improvements upon the structure and function of the suspension assemblies are still desired.

SUMMARY OF THE INVENTION

According to one aspect of the present invention, an adjustable bicycle suspension system includes a first stroke adjustment unit and a second stroke adjustment unit. The first stroke adjustment unit is configured to adjust a stroke of a suspension by changing a position of the suspension at a first position or a second position. The second stroke adjustment unit is configured to change the position of the suspension at the second position independently from the first position.

Additional features, aspects, and advantages of the present invention will become apparent to those skilled in the art from the following detailed description, wherein various exemplary embodiments are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, wherein:

FIG. 6 is an enlarged view of a lower portion of the damper adjustment of FIG. 4 in a "normal" operating state, according to an exemplary embodiment;

FIG. 7 is a transverse sectional view of the lower portion of the damper adjustment unit of FIG. 6 taken along line VII-VII, according to an exemplary embodiment;

FIG. 8 is an enlarged view of a lower portion of the damper adjustment unit of FIG. 4 in a "locked out" operating state, according to an exemplary embodiment;

FIG. 9 is a transverse sectional view of the lower portion of the damper adjustment unit of FIG. 8 taken along line IX-IX, according to an exemplary embodiment;

DESCRIPTION OF THE EMBODIMENTS

Figure 1:
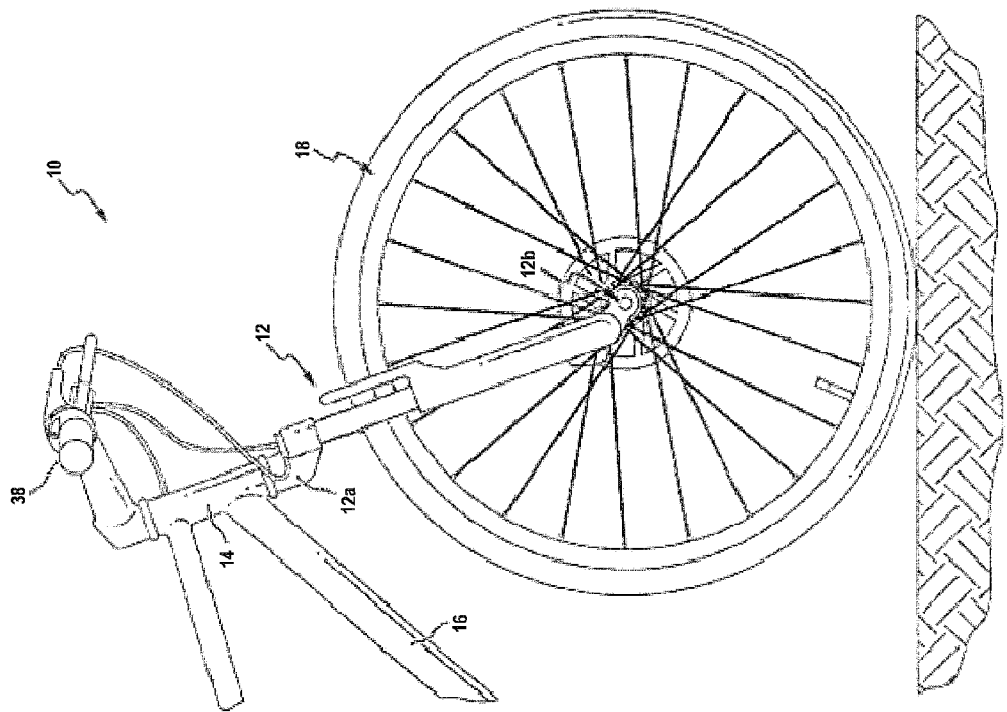
FIG. 1 is a schematic elevation view of a portion of a bicycle equipped with an adjustable suspension assembly, according to an exemplary embodiment.

Various exemplary embodiments will now be described hereinafter with reference to the accompanying drawings, wherein like reference numerals designate corresponding or identical elements throughout the various drawings. Accordingly, the drawings and description are to be regarded as illustrative in nature, and not as restrictive.

Figure 3:
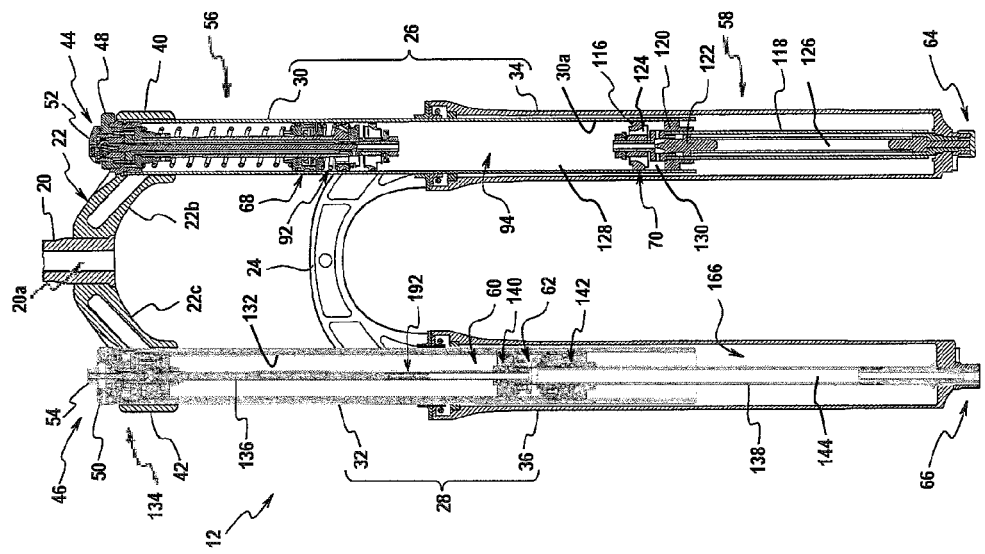
FIG. 3 is a longitudinal sectional view of the adjustable suspension assembly of FIGS. 1 and 2, according to an exemplary embodiment.
Figure 2:
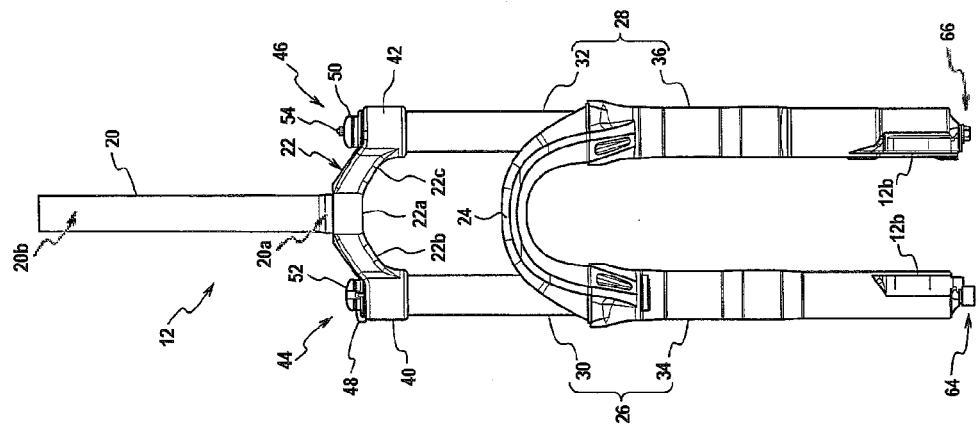
FIG. 2 is a schematic elevation view of the adjustable suspension assembly of FIG. 1, according to an exemplary embodiment.

FIG. 1 is a schematic elevation view of a portion of a bicycle equipped with an adjustable suspension assembly, according to an exemplary embodiment. FIG. 2 is a schematic elevation view of the adjustable suspension assembly of FIG. 1, whereas FIG. 3 is a longitudinal cross sectional view of the adjustable suspension assembly of FIGS. 1 and 2. In one particular implementation, the adjustable suspension assembly is a front, fork-type adjustable suspension assembly of a bicycle configured to enable a rider (not shown) to adjust a stroke of the adjustable suspension assembly. While specific reference will be made hereto, it is contemplated that various exemplary embodiments also find application in other adjustable suspension assemblies, such as upside-down adjustable suspension assemblies, linear adjustable suspension assemblies, rear adjustable suspension assemblies, etc., as well as in other vehicles, e.g., tricycles, motorcycles, and the like.

Referring initially to FIGS. 1 and 2, a bicycle 10 includes an adjustable suspension assembly (or suspension) 12 having an upper end portion 12a rotatably mounted within, for example, a front part (e.g., head tube) 14 of a frame 16 of bicycle 10 and lower end portions 12b rotatably coupled to an axle (not illustrated) of wheel 18 of bicycle 10. In this manner, suspension 12 includes a center member (e.g., steerer tube) 20, a first connector (e.g., crown) 22, a second connector (e.g., arch) 24, a first shock absorber unit 26, and a second shock absorber unit 28. Shock absorber units 26 and 28 include, respectively, upper telescopic members 30 and 32 slidably received in corresponding lower telescopic members 34 and 36. A center portion (cylindrical column securing portion) 22a of the connector 22 is secured to a bottom end portion 20a of the center member 20, whereas the shock absorber units 26 and 28 are secured at lateral ends (arm portions) 22b and 22c of the connector 22. In one implementation, a handlebar 38 may be fixedly mounted to the center member 20 at an upper end portion 20b and, thereby, may be configured to enable a rider to steer the bicycle 10, as well as provide means for connecting the handlebar 38 to the suspension 12. As such, the suspension 12 (via the shock absorber units 26 and 28) is configured to adjustably absorb and dampen, for example, terrain-induced vibrations that would otherwise be transmitted to the rider through the wheel 18 and the frame 16.

In particular implementations, the center member 20 includes, for example, a tubular member rotatably supported by the front part 14 of the frame 16. The upper end portion 20b of the center member 20 is fixedly engaged to the handlebar 38. The bottom portion 20a of the center member 20 is insertably received in the center portion 22a of the connector 22 and secured therein via any appropriate means, e.g., press fitting, screw fitting, welding, etc. In this manner, the connector 22 may constitute a fork-type shoulder unit having, for instance, the cylindrical column securing portion 22a at its center for mounting the center member 20 therein (or thereto). Further, the connector 22 includes the arm portions 22b and 22c that extend laterally from the center portion 22a. The arm portions 22b and 22c may be arcuately formed to curve, for instance, in a downward fashion. Respective free ends of the arm portions 22b and 22c include corresponding shock absorber mounting portions 40 and 42 configured to, for example, engage with upper end portions of the shock absorber units 26 and 28, such as via a clamp fitting, press fitting, screw fitting, welding, etc. The second connector 24 is provided and, thereby, configured to rigidly connect the lower telescopic member 34 of the shock absorber unit 26 to the lower telescopic member 36 of the shock absorber unit 28. In this manner, the second connector 24 provides structural stability (or support) to the suspension 12.

As previously mentioned, the suspension 12 may be incorporated into (or otherwise define) a fork of the bicycle 10, such as a front-fork of the bicycle 10. It is contemplated, however, that the suspension 12 may be alternatively (or additionally) utilized as or part of a rear suspension assembly and, thereby, may include other components corresponding to these other suspension assembly configurations. In the illustrated embodiment, the shock absorber unit 26 includes the upper telescopic member 30 telescopically received in the lower telescopic member 34. Accordingly, the upper telescopic member 30 includes an upper (or first) end thereof connected to (e.g., threadedly engaged with) the mounting portion 40 of the connector 22 and a lower (or second) end thereof slidably received within an upper (or first) end of the lower telescopic member 34, such that the upper telescopic member 30 is telescopically movable with respect to the lower telescopic member 34 and the lower telescopic member 34 is telescopically movable with respect to the upper telescopic member 30. In a similar fashion, the shock absorber unit 28 includes the upper telescopic member 32 telescopically received in the lower telescopic member 36. The upper telescopic member 32 includes an upper (or first) end thereof connected to (e.g., threadedly engaged with) the mounting portion 42 of the connector 22 and a lower (or second) end thereof slidably received within an upper end of the lower telescopic member 36, such that the upper telescopic member 32 is telescopically movable with respect to the lower telescopic member 36 and the lower telescopic member 36 is telescopically movable with respect to the upper telescopic member 32. According to an embodiment of the present invention, in a case where the suspension 12 is an upside-down type suspension, the shock absorber unit 26 may include the lower telescopic member 34 telescopically received in the upper telescopic member 30. Accordingly, the upper telescopic member 30 includes the upper end (or first end) thereof connected to (e.g., threadedly engaged with) the mounting portion 40 of the connector 22 and a lower end (or second end) thereof slidably receives an upper end (or first end) of the telescopic member 34, such that the upper telescopic member 30 is telescopically movable with respect to the lower telescopic member 34 and the lower telescopic member 34 is telescopically movable with respect to the upper telescopic member 30. In a similar fashion, the shock absorber unit 28 may include the lower telescopic member 36 telescopically received in the upper telescopic member 32. The upper telescopic member 32 includes an upper end (or first end) thereof connected to (e.g., threadedly engaged with) the mounting portion 42 of the connector 22 and a lower end (or second end) thereof slidably receives an upper end of the lower telescopic member 36, such that the upper telescopic member 32 is telescopically movable with respect to the lower telescopic member 36 and the lower telescopic member 36 is telescopically movable with respect to the upper telescopic member 32. It is noted that various interior cavities of the shock absorber units 26 and 28 form respective internal volumes of the upper telescopic members 30 and 32 and the lower telescopic members 34 and 36 that dynamically change when the upper telescopic members 30 and 32 and the lower telescopic members 34 and 36 correspondingly move together (such as when the shock absorber units 26 and 28 compress) or move apart (such as when the shock absorber units 26 and 28 expand or rebound). It is also noted that lower ends (e.g., drop outs) 12b of the lower telescopic members 34 and 36 are attached to an axle (not shown) of the wheel 18 via any suitable coupling device, assembly, or mechanism.

According to exemplary embodiments, the upper telescopic members 30 and 32 may be respectively provided with suspension setting mechanisms 44 and 46 for adjusting (e.g., dynamically adjusting) stroke and/or damping force characteristics of the suspension 12 and, as a result, enabling the rider to control the expansion and contraction of the suspension 12. It is noted that the suspension setting mechanisms 44 and 46 are preferably provided at upper end portions of the upper telescopic members 30 and 32, respectively, and preferably protrude from an upper surface of the connector 22. In this manner, the suspension setting mechanisms 44 and 46 may respectively include one or more adjustment actuators, such as adjustment actuators 48, 50, 52, and 54 configured to adjust various stroke and/or damping force characteristics of the suspension 12. Even though the suspension setting mechanisms 44 and 46 are shown exposed to an ambient environment, it is contemplated that the suspension setting mechanisms 44 and/or 46 may be covered (or otherwise concealed) by way of one or more housing members (not shown).

As will become more apparent below, the adjustment actuator 48 is configured to control a lock-out setting of the shock absorber unit 26, whereas the adjustment actuator 52 is configured to enable fine tuning (or adjusting) of a damping force characteristic of the shock absorber unit 26. To this end, the adjustment actuator 50 is configured to control a long-to-short stroke (or short-to-long stroke) setting of the shock absorber unit 28, whereas the adjustment actuator 54 is configured to enable fine tuning (or adjusting) of one or more short stroke settings of the shock absorber unit 28. It is also contemplated that the adjustment actuator 54 may be additionally (or alternatively) configured to enable fine tuning (or adjusting) of one or more long stroke settings of the shock absorber unit 28. It is also noted that, while not illustrated, the suspension setting mechanisms 44 and 46 may be manually operated (e.g., directly actuated by the rider of the bicycle 10) or actuated via any suitable control mechanism, such as a button operated, lever operated, rotating member operated, etc., control mechanism attached to, for example, the frame 16, the handlebar 38, etc., of the bicycle 10.

With continued reference to FIG. 3, the suspension 12 includes shock absorber unit 26 that is configured as the damper adjustment unit and, thereby, incorporates one or more adjustable dampening assemblies, such as an upper adjustable dampening assembly (or dampening assembly) 56 and a lower adjustable dampening assembly 58, whereas the shock absorber unit 28 is configured as the stroke adjustment unit and, thereby, incorporates a plurality of adjustable gas (e.g., air) springs, such as a positive adjustable gas spring (or air spring) 60 and a negative adjustable gas spring (or air spring) 62. In this manner, the shock absorber unit 28 provides resistance to compression of the suspension 12 and releases stored energy during compression to cause the suspension 12 to expand (or rebound). The shock absorber unit 26 provides damping force which resists both compression and rebound of the suspension 12 and, thereby, regulates rate of compression and rebound of the suspension 12. Accordingly, the conjunctive operation of the dampening assemblies 56 and 58, as well as the air springs 60 and 62, in unison with, for instance, the connectors 22 and 24, provides the suspension 12 with adjustable spring and dampening characteristics. As previously mentioned, the shock absorber unit 26 incorporates the suspension setting mechanism 44 that serves as an upper damper adjustment unit at, for example, an upper end of the dampening unit 56, whereas the shock absorber unit 28 incorporates the suspension setting mechanism 46 that serves as an upper stroke adjustment unit at, for instance, an upper end of the air spring 60. It is noted that a lower damper adjustment unit 64 is provided at, for instance, a lower end of the lower telescopic member 34 of the shock absorber unit 26 and a lower stroke adjustment unit 66 is provided at, for example, a lower end of the lower telescopic member 36 of the shock absorber unit 28.

According to exemplary embodiments, the damper adjustment unit 26 includes an upper damping unit 68, the upper damper adjustment unit 44, a lower damping unit 70, and the lower damper adjustment unit 64. The upper damping unit 68 and the upper damping adjustment unit 44 form the upper dampening assembly 56, whereas the lower damping unit 70 and the lower damping adjustment unit 64 form the lower dampening assembly 58. It is noted that the upper damper adjustment unit 44 is disposed at a top end of the upper telescopic member 30 with the upper damping unit 68 disposed within a top portion of the upper telescopic member 30. Further, the lower damper adjustment unit 64 is disposed at a bottom end of the lower telescopic member 34 with the lower dampening unit 70 disposed within a bottom portion of the upper telescopic member 30.

Averting to FIGS. 4-9, a plurality of enlarged, longitudinal and transverse sectional views of portions of the upper dampening assembly 56 of the suspension 12 are illustrated. According to exemplary embodiments, the upper dampening assembly 56 includes a damping piston 72, a lockout valve 74, a lockout piston 76, a return valve 78, a blow-off mechanism 80, a free piston 82, a compression spring 84, an upper support member 86, an upper body member 88, and a damping force adjustment valve 90. The lockout valve 74 and the lockout piston 76 cooperate to form a damping lockout mechanism that effectively locks the suspension 12 so that the suspension 12 can function as a rigid non-suspension fork, when in a "locked out" mode (or operating state).

The adjustment unit 44 is positioned at a top portion of the upper telescopic member 30 and is operatively coupled to the lockout valve 74 and the damping force adjustment valve 90. According to particular embodiments, the adjustment unit 44 includes the first adjustment actuator (first actuating member) 48 and the second adjustment actuator (second actuating member) 52. The first actuating member 48 is operatively coupled to the lockout valve 74 to enable the upper damping unit 68 to be "locked out," whereas the second actuating member 52 is operatively coupled to the damping force adjustment valve 90 to enable adjustment of a damping force of the upper damping unit 68.

The damping piston 72 essentially divides the upper telescopic member 30 into two areas so as to define an upper internal chamber 92 (or reservoir chamber) and a lower internal chamber 94 (or fluid chamber). In this manner, the damping piston 72 includes an annular seal (or O-ring) 72a disposed between an outer peripheral surface of the damping piston 72 and an internal surface 30a of the upper telescopic member 30 to create a seal therebetween and, thereby, define the upper and lower internal chambers 92 and 94. The damping piston 72 may also include a plurality of rebound ports 96 and a plurality of compression ports 98. The rebound ports 96 and the compression ports 98 are alternately arranged about the damping position 72, such as in a circumferential manner around the damping piston 72. In one embodiment, the damping piston 72 includes a check valve 100 and a shim stack valve 102; however, it is contemplated that other suitable directional valves (or flow control mechanisms) may be employed.

In the depicted embodiment, the check valve 100 may include a check valve plate 100a, a compression spring 100b, and a spring retainer 100c. In this manner, the check valve plate 100a may press against a lower end portion of the damping piston 72 as a result of a biasing force imposed by the compression spring 100b that, in a "normal" state closes off the rebound ports 96; however, during suspension rebound (e.g., expansion of the suspension 12), fluid from the lower internal chamber 94 displaces the check valve plate 100a from the lower end of the damping piston 72 and, thereby, opens the rebound ports 96, which enables fluid from the lower internal chamber 94 to flow therethrough. As such, the check valve 100 selectively enables fluid communication between the upper internal chamber 92 and the lower internal chamber 94 through the rebound ports 96 during rebounding displacement of the suspension 12.

The shim stack valve 102, in a "normal" state abuts an upper end portion of the damping piston 72 to close off the compression ports 98. In this manner, the shim stack valve 102 may be a single shim, or a stack comprised of multiple shims, which may be substantially annular in shape, however, any suitable geometry may be utilized. The shim stack valve 102 selectively enables fluid communication between the upper internal chamber 92 and the lower internal chamber 94 via the compression ports 98. During compression of the suspension 12, the shim stack valve 102 may essentially serve as a diaphragm spring and, thereby, is configured to flex in response to aggregation of a sufficient (e.g., predetermined) amount of fluid pressure in the lower internal chamber 94. During rebounding displacement of the suspension 12, the shim stack valve 102 is engaged with an upper surface of the damping piston 72 to prevent fluid from flowing through the shim stack valve 102. It is noted, however, that the check valve 100 enables fluid communication between the upper internal chamber 92 and the lower internal chamber 94 through the rebound ports 96 during rebound of the suspension 12.

The lockout valve 74 is rotatably mounted in the upper telescopic member 30 with an outer peripheral surface of the lockout valve 74 being spaced inwardly from the internal surface 30a of the upper telescopic member 30. In this manner, the lockout valve 74 is rotatable between a lockout position corresponding to a non-damping or lockout mode (or operating state) and an unlocked position corresponding to a "normal" damping mode (or operating state). According to exemplary embodiments, however, the lockout valve 74 may be rotatable between any number of positions that ultimately progress towards the aforementioned lockout position. In any event, rotating the lockout valve 74 to a lockout position (or state), fluid flow through the lockout piston 76 and, thereby, between the upper and lower internal chambers 92 and 94 is effectively blocked. When the lockout valve 74 is in an unlocked position, fluid may flow through the lockout piston 76 and, thereby, between the upper and lower internal chambers 92 and 94 so that the suspension 12 can operate in one or more "normal" operating states, i.e., one or more operating states configured to absorb and dampen terrain-imposed vibrations.

Averting to FIGS. 6 and 8, the lockout valve 74 may include a main body portion 74a, an upper shaft portion 74b, and a lower shaft portion 74c. A center bore 74d extends axially through the portions 74a to 74c to enable fluid to flow therethrough. As seen in FIGS. 7 and 9, the main body portion 74a includes a plurality of lobe sections (e.g., three lobe sections), which may be equally spaced apart in a circumferential direction and, thereby, define a plurality of axial fluid flow passages 104. In this manner, a plurality of radial bores (e.g., three radial bores) 74e extend radially from the center bore 74d to the axial fluid flow passages 104 to enable fluid to flow from the center bore 74d through the radial bores 74e to the axial fluid flow passages 104 during compression of the suspension 12. Accordingly, the center bore 74d and the radial bores 74e form a center compression fluid passage connecting the lower internal chamber 94 to the upper internal chamber 92. The damping force adjustment valve 90 can be disposed in the center bore 74d of the lockout valve 74 for regulating a flow rate of fluid passing from the center bore 74d through the radial bores 74e to the axial fluid flow passages 104. In this manner, a lower tip end of the damping force adjustment valve 90 cooperates with the center bore 74d of the lockout valve 74 to essentially form a needle valve. As such, the damping force adjustment valve 90 is axially movable within the center bore 74d of the lockout valve 74 such that the tip end of the damping force adjustment valve 90 can selectively modify a flow area between the center bore 74d and the tip end of the damping force adjustment valve 90.

The upper shaft portion 74b of the lockout valve 74 may include internal threads within the center bore 74d of the lockout valve 74 for securing the first actuating member 48 thereto, as will become more readily apparent below. As such, rotation of the first actuating member 48 causes the lockout valve 74 to rotate therewith. The lower shaft portion 74c of the lockout valve 74 supports the damping piston 72 together with the check valve 100 and the shim stack valve 102. In particular, a lower end of the lower shaft portion 74c of the lockout valve 74 includes an external thread for threadedly receiving a nut 106.

According to certain exemplary embodiments, the lockout piston 76 includes a piston portion 76a and a shaft portion 76b. The piston portion 76a includes an annular seal (or O-ring) 108 disposed between an outer peripheral surface of the piston portion 76a and the internal surface 30a of the upper telescopic member 30 to create a seal therebetween. The piston portion 76a may include a plurality of main fluid flow ports (e.g., three main fluid flow ports) 76c, a plurality of blow ports (e.g., six blow ports) 76d and a plurality of return ports (e.g., eighteen return ports) 76e. The main fluid flow ports 76c may be arranged about the piston portion 76a, such as arranged in a circumferential manner around the piston portion 76a with each of the areas between the main fluid flow ports 76c including, for instance, the two blow ports 76d. The main fluid flow ports 76c may be axially arranged and configured to extend between the upper and lower axial end faces of the piston portion 76a. The blow ports 76d extend at an angle with respect to a center axis of the lockout piston 76 to enable the blow ports 76d to extend between the upper and lower axial end faces of the piston portion 76a. The return ports 76e are arranged, such as in three groups of the six ports 76e with one of the groups of return ports 76e being located radially outward from a corresponding one of the main fluid flow ports 76c. The return ports 76e may extend at an angle with respect to a center axis of the lockout piston 76 so that the return ports 76e can extend between the lower axial end face of the piston portion 76a and one of the main fluid flow ports 76c.

As previously described, the lockout valve 74 prevents fluid from flowing through the damping piston 72 when in a lockout mode; however, when the lockout valve 74 is in one or more non-lockout modes, the axial fluid flow passages 104 enable the fluid flow ports of the damping piston 72 to be axially aligned with the fluid flow ports of the lockout valve 74. A flow direction of fluid through the damping piston 72, the lockout valve 74, and the lockout piston 76 during compression of the suspension 12 is primarily axially upward when the damping lockout mechanism is in a non-lockout mode. Accordingly, a directional flow of fluid through the damping piston 72, the lockout valve 74, and the lockout piston 76 does not reverse its axial direction Likewise, a directional flow of fluid through the damping piston 72, the lockout valve 74, and the lockout piston 76 does not extend in a primarily radial direction at any point through the damping piston 72, the lockout valve 74, and the lockout piston 76. Such a substantially linear (e.g., axial) flow path of fluid through the damping piston 72, the lockout valve 74, and the lockout piston 76 effectively prevents unnecessary damping effects from occurring at a flow path through the damping piston 72, the lockout valve 74, and the lockout piston 76.

According to exemplary embodiments, the return valve 78 may be disposed between the main body portion 74a of the lockout valve 74 and the piston portion 76a of the lockout piston 76. In this manner, the return valve 78, in a "normal" operating state, closes off the return ports 76e of the lockout piston 76 so that fluid does not flow through the return ports 76e of the lockout piston 76. According to one implementation, the return valve 78 may include a return valve plate 78a and a compression spring 78b. The return valve plate 78a, in a "normal" operating state, abuts a lower end of the lockout piston 76 by the compression spring 78b to close off the return ports 76e. It is noted; however, that during rebound of the suspension 12 when in a lockout mode, fluid in the lower internal chamber 94 forces the return valve plate 78a away from a lower end of the lockout piston 76 to open the return ports 76e and, thereby, enables fluid to flow therethrough. As such, the return valve 78 selectively enables fluid communication between the upper internal chamber 92 and the lower internal chamber 94 through the return ports 76e during rebound of the suspension 12. Furthermore, the return ports 76e may serve to bias the lockout piston 76 when the suspension 12 rebounds while in the lockout mode.

The blow-off mechanism 80, in a "normal" operating state, abuts an upper end of the lockout piston 76 to close off the blow ports 76d. In this manner, the blow-off mechanism 80 may be provided to include a blow-off valve plate 80a, an abutment plate 80b and a compression spring 80c disposed between the blow-off valve plate 80a and the abutment plate 80b. The blow-off mechanism 80 selectively permits fluid communication between the upper internal chamber 92 and the lower internal chamber 94 through the blow ports 76d. During a normal operating mode of the suspension 12, the blow-off mechanism 80 engages with an upper surface of the lockout piston 76 in order to prevent fluid from flowing through the blow-off mechanism 80. When in a lockout mode, if the suspension 12 is subjected to a sufficiently large enough force to counteract the compression spring 80c, the blow-off mechanism 80 may act as a safety valve and, thereby, permit the suspension 12 to compress. In response to such forces on the suspension 12 when in the aforementioned lockout mode, aggregation of a sufficient (e.g., predetermined amount) of fluid pressure acting on the blow-off mechanism 80 from the lower internal chamber 94 will open the blow ports 76d to enable fluid flow through the blow ports 76d into the upper internal chamber 92.

According to various embodiments, the shaft portion 76b of the lockout piston 76 may be integrally formed with the piston portion 76a of the lockout piston 76 as a one-piece, e.g., unitary, member. An upper end of the shaft portion 76b of the lockout piston 76 may be threaded to the upper support member 86 so that the lockout piston 76 remains stationary with respect to the upper telescopic member 30.

Shock absorber unit 26 also includes the free piston 82 axially slidable on the shaft portion 76b of the lockout piston 76. It is noted, however, that the free piston 82 is normally held by fluid pressure within the lower internal chamber 94 against the compression spring 84. When the suspension 12 is compressed, fluid pressure in the upper internal chamber 92 of the upper telescopic member 30 increases to compress the compression spring 84 such that an area of the upper internal chamber 92 increases. During rebound, fluid pressure in the upper internal chamber 92 of the upper telescopic member 30 decreases and the compression spring 84 moves the free piston 82 back to its "normal" resting position (or state). According to certain embodiments, the free piston 82 has an annular seal (or O-ring) 110 disposed between an outer peripheral surface of the free piston 82 and the internal surface 30a of the upper telescopic member 30 to create a seal therebetween. Also, the free piston 82 may have an inner sealing arrangement between an inner peripheral surface of the free piston 82 and an outer surface of the shaft portion 76b of the lockout piston 76 so as to create a seal therebetween. As such, an uppermost internal space 112 of the upper telescopic member 30 above the free piston 82 may be isolated from the upper internal chamber 92 of the upper telescopic member 30. Accordingly, circulation of dampening fluid between the lower internal chamber 94 and the upper internal chamber (or reservoir) 92 acts to equalize pressure differentials arising in the shock absorber unit 26 as the lower internal chamber 94 expands and contracts.

Referring back to FIGS. 4 and 5, the upper support member 86 includes a stepped center bore with a lower bore portion 86a with an internal thread, a middle bore portion 86b with an annular seal or O-ring, and an upper bore portion 86c having a respectively larger diameter than respective diameters of the bore portions 86a and 86b. The upper support member 86 is threaded into the upper body member 88 so as to be fixed to an upper end of the upper telescopic member 30. An annular seal (or O-ring) is disposed between an outer peripheral surface of the upper support member 86 and an internal surface of the upper body member 88 to create a seal therebetween. An upper end of the shaft portion 76b of the lockout piston 76 is threaded into the lower bore portion 86a of the upper support member 86 so as to be fixed to the upper end of the upper telescopic member 30. In this manner, the upper bore portion 86c of the upper support member 86 rotatably supports part of the first actuating member 48, as will be described in more detail below.

According to exemplary embodiments, the upper body member 88 is threaded into an upper end of the upper telescopic member 30 with an annular seal (or O-ring) 114 disposed between an outer peripheral surface of the upper body member 88 and the internal surface 30a of the upper telescopic member 30 so as to create a seal therebetween. The upper body member 88 has a stepped center bore with a lower bore portion 88a including an internal thread, a middle bore portion 88b having an internal thread, and an upper bore portion 88c having a plurality of indexing recesses. The upper body member 88 also has an annular recess 88d in an upper surface with the annular recess 88d coaxially surrounding the upper bore portion 88c. A plurality of curved slots (e.g., two curved slots) 88e are formed in the upper body member 88 so that the lower bore portion 88a can communicate with the annular recess 88d. It is noted that the curved slots 88e may be arcuately shaped slots having center points located on a center axis of the stepped center bore of the upper body member 88. The upper bore portion 88c and the annular recess 88d form an upper shaft portion having an external thread that threadedly receives the second actuating member 52 therein.

The damping force adjustment valve 90 has an upper end coupled to the second actuating member 52 so that operation of the second actuating member 52 causes the damping force adjustment valve 90 to move in an axial direction. For instance, an upper end of the damping force adjustment valve 90 is externally threaded and, thereby, threadedly engaged with an internal thread of the middle bore portion 88b of the upper body member 88. Accordingly, when the second actuating member 52 is rotated, the damping force adjustment valve 90 is also rotated, but the damping force adjustment valve 90 also moves in an axial direction due to engagement of the external thread of the internal thread of the middle bore portion 88b of the upper body member 88. Axial movement of the damping force adjustment valve 90 enables selective adjustment of a fluid flow rate of fluid from the lower internal chamber 94 to the upper internal chamber 92. As such, a lower tip end of the damping force adjustment valve 90 cooperates with the center bore 74d of the lockout valve 74 to form, in essence, a needle valve.

In the illustrated embodiment, the first and second actuating members 48 and 52 are capable of mutually exclusive actuation such that the damping force adjustment valve 90 can remain in a set position when the first actuating member 48 is operated (e.g., rotated) between a lockout position (or state) corresponding to a non-damping or lockout mode and an unlocked position (or state) corresponding to a normal damping or operating mode. Furthermore, the first and second actuating members 48 and 52 are both rotatably mounted to the upper body member 88 about a common center axis of the upper telescopic member 30. In this manner, the second actuating member 52 is disposed within the first actuating member 48 so that the first actuating member 48 can rotate about the second actuating member 52.

Figure 5:
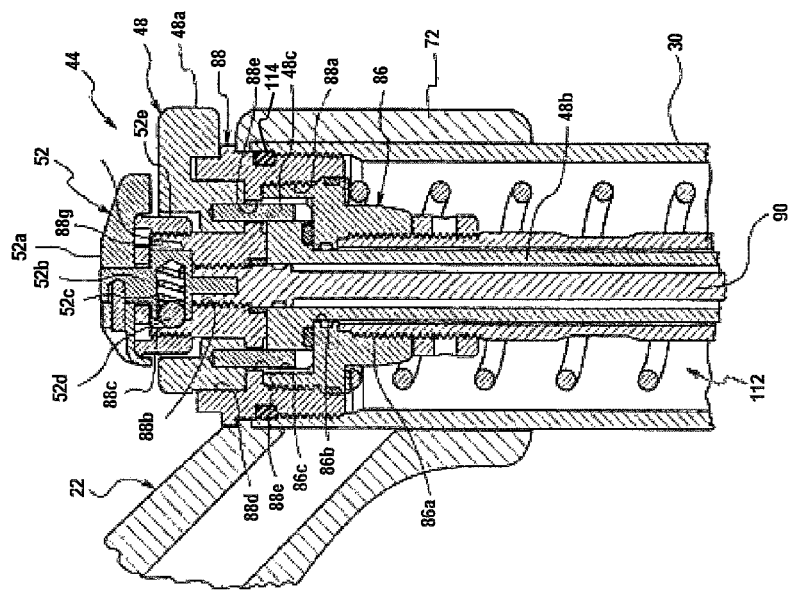
FIGS. 4 and 5 are enlarged, longitudinal sectional views of an upper portion of a damper adjustment unit of the adjustable suspension assembly of FIGS. 1-3, according to an exemplary embodiment.
Figure 4:
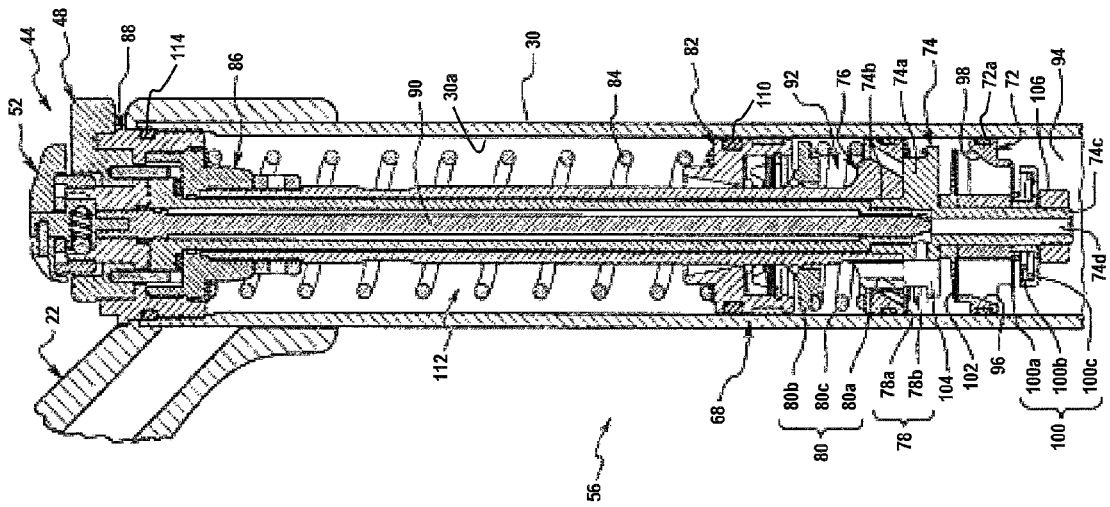

According to exemplary embodiments, the second actuating member 52 includes a knob portion 52a, a shaft portion 52b, a spring 52c, a ball detent 52d, and an internally threaded cap 52e (FIG. 5). The spring 52c and the ball detent 52d are located in a radially extending bore of the shaft portion 52b, such that the ball detent 52d is biased against an annular inner surface of the upper body member 88. An inner surface of the upper body member 88 has a plurality of recesses 88g (only two of which are illustrated) that selectively engage with the ball detent 52d to provide individual adjustment points for controlling a clamping rate for the adjustment unit 44. As such, an indexing arrangement is formed by the shaft portion 52b, the spring 52c, the ball detent 52d, and the recesses 88g. The shaft portion 52b of the second actuating member 52 has a lower end thereof including a non-circular cross section disposed in a non-circular bore of an upper end of the damping force adjustment valve 90. The knob portion 52a is fixedly mounted to an upper end of the shaft portion 52b of the second actuating member 52 by, for example, a set screw, pin, or other suitable fixing mechanism. In this manner, rotation of the second actuating member 52 causes the damping force adjustment valve 90 to rotate therewith. It is noted that the internally threaded cap 52e may be threaded onto the upper body member 88. When the internally threaded cap 52e is threaded onto the upper body member 88, the shaft portion 52b of the second actuating member 52 is prevented from moving upwardly such that a lower end of the shaft portion 52b can remain disposed within the aforementioned non-circular bore of the upper end of the damping force adjustment valve 90. Since the knob portion 52a is fixedly mounted to an upper end of the shaft portion 52b, the internally threaded cap 52e may also act to retain the knob portion 52a of the second actuating member 52 to the damping force adjustment valve 90.

In certain exemplary embodiments, the first actuating member 48 includes a portion 48a and a control rod 48b. The portion 48a and the control rod 48b are interconnected via a plurality of pins 48c so that the portion 48a and the control rod 48b can rotate together as a unit, such as in response to actuation of the first actuating member 48.

Averting back to FIG. 3, the lower damping unit 70, according to various exemplary embodiments, includes a lower sealing member (or damping piston) 116, tube (or connecting rod) 118, a sealing member 120, and a damping force adjustment valve 122. It is noted that the lower damping unit 70 becomes immovable in the lockout mode due to the free piston 82 becoming immovable in response to a lock-out operation essentially characterized by a scenario where dampening fluid can no longer flow through the upper damping unit 68. The lower damping unit 70 may be any suitable damping mechanism and, therefore, is not described or illustrated in any further detail. It is noted, however, that the damping piston 116 is held stationary with respect to the lower telescopic member 34 of the shock absorber unit 26 and, thereby, slidably contacts the internal surface 30a of the upper telescopic member 30. The damping piston 116 includes axially extending fluid flow ports 124 configured to provide a damping effect as the damping piston 116 extends and retracts within the lower internal chamber 94. The connecting rod 118 is, in exemplary embodiments, a hollow rod that fixedly attaches the damping piston 116 to a bottom end of the lower telescopic member 34. In this manner, an interior cavity region 126 of the connecting rod 118 is sealed at its upper and lower ends so as to form an air tight chamber. The damping piston 116 forms a seal between an upper end of the connecting rod 118 and the internal surface 30a of the upper telescopic member 30. The sealing member 120, however, is held stationary with respect to the lower telescopic member 34 and slidably contacts the internal surface 30a of the upper telescopic member 30. In this manner, the damping force adjustment valve 122 is disposed in an upper end of the connecting rod 118 in order to regulate a fluid flow rate passing from an upper cavity region 128 above the damping piston 116 to a lower cavity region 130 below the damping piston 116. In this manner, the damping piston 116 effectively divides the lower internal chamber 94 into the upper cavity region 128 and the lower cavity region 130, with the fluid flow ports 124 of the damping piston 116 enabling fluid to travel from one cavity to the other depending on longitudinally aligned forces acting on the upper telescopic member 30 and the lower telescopic member 34. It is noted that an effective dampening force realized by way of the lower damping unit 70 is substantially related to a volume of fluid capable of traveling through the fluid flow ports 124 when movement of the damping piston 116 displaces into (or out of) the lower internal chamber 94. As such, dampening forces may act on the upper telescopic member 30, as well as the lower telescopic member 34. It is further noted that lower damper adjustment unit 64 is configured and arranged to move damping force adjustment valve 122 in an axial direction and, thus, to regulate the fluid flow rate between the upper cavity region 128 and the lower cavity region 130.

With continued reference to FIG. 3, FIGS. 10-12 illustrate various enlarged, longitudinal sectional views of various portions of the stroke adjustment unit 28. According to various exemplary embodiments, the stroke adjustment unit 28 includes the upper (or first) telescopic member 32, the lower (or second) telescopic member 36, an inner tube (or sleeve) 132, a cap assembly (upper capping member) 134, a first (or upper) piston rod 136, a second (or lower) piston rod 138, a first (or upper) piston 140, and a second (or lower) piston 142. In this manner, the upper adjustable gas (e.g., air) spring 60 is defined by a first volume enclosed by the upper capping member 134, the inner sleeve 132, and the upper piston 140, whereas the lower adjustable gas (e.g., air) spring 62 is defined by a second volume enclosed by the upper piston 140, the inner sleeve 132, and the lower piston 142. The gas springs 60 and 62 may be pressurized via the lower stroke adjustment unit (or gas fill valve) 66. Accordingly, the positive gas spring 60 acts to resist compressive movement (i.e., compression) of the suspension 12, in which an overall length of the upper telescopic member 32 and the lower telescopic member 36 is reduced. The negative gas spring 62 acts in opposition to the positive gas spring 60. Namely, the negative gas spring 62 provides force tending to compress the suspension 12 or resist extension movement (i.e., rebound) of the suspension 12, in which an overall length of the upper telescopic member 32 and the lower telescopic member 36 is increased. As will become more apparent below, longitudinal positioning of the pistons 140 and 142 within the upper telescopic member 32 may be adjusted via the upper stroke adjustment unit 46, such that actuation of the upper stroke adjustment unit 46 determines a stroke length (e.g., a maximum stroke length, a minimum stroke length, or one or more stroke lengths therebetween) of the shock absorber unit 28.

Figure 12:
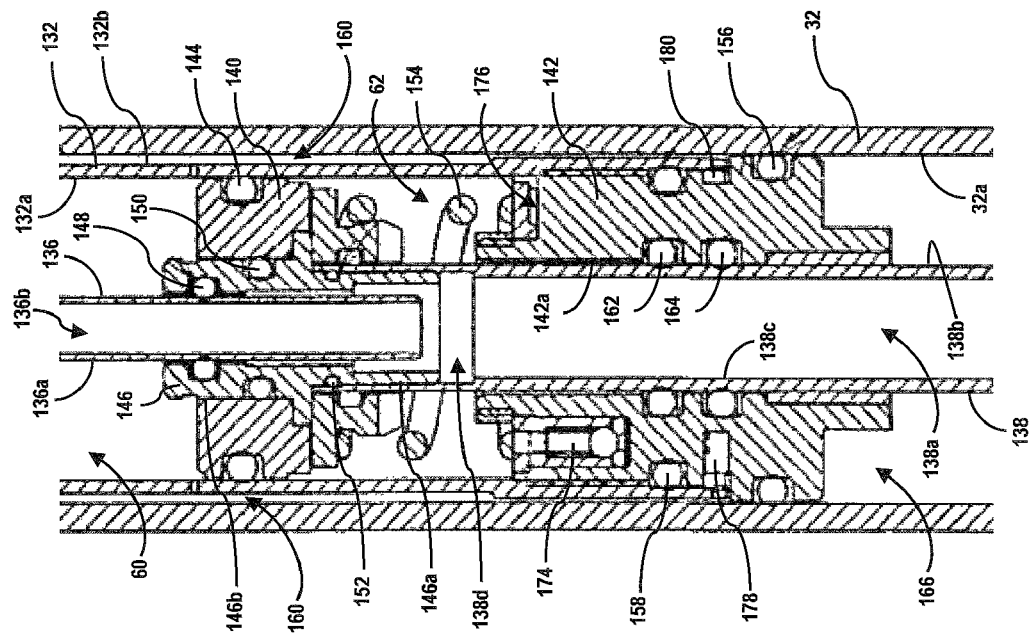
FIG. 12 is an enlarged, longitudinal cross sectional view of a second intermediate portion of the stroke adjustment unit of the adjustable suspension assembly of FIGS. 1-3, according to an exemplary embodiment.

In the illustrated embodiment, the lower piston rod 138 is a rigid, hollow rod having a hollow interior region 138*a* (FIG. 12). The lower piston rod 138 supports the upper piston 140 within the upper telescopic member 32 and slidably engages with, for example, an inner peripheral surface 142*a* of the lower piston 142. A lower end of the lower piston rod 138 is fixedly coupled to a bottom end of the lower telescopic member 36 of the stroke adjustment unit 28, whereas the upper piston 140 is fixedly engaged to an upper end of the lower piston rod 138. As such, the lower piston rod 138 extends longitudinally upward from a closed bottom end of the lower telescopic member 36 and, thereby, supports the upper piston 140. The lower piston 142 is disposed at an intermediate axial position of the upper telescopic member 32 by the inner sleeve 132. The inner sleeve 132, according to exemplary embodiments, is coaxially disposed within the upper telescopic member 32, with an upper end of the inner sleeve 132 rigidly coupled to the cap assembly 134 and a lower end of the inner sleeve 132 rigidly coupled to the lower piston 142. In this manner, as the shock absorber unit 28 expands and contracts, the lower piston 142 is fixed for longitudinal displacement with the upper telescopic member 32, whereas the upper piston 140 is fixed for longitudinal displacement with the lower telescopic member 36. It is noted that the upper piston 140 is in sliding engagement with the inner sleeve 132 and the lower piston 142 is in sliding engagement with the lower piston rod 138.

As described, the positive gas spring 60 is defined between the cap assembly 134 (which closes off an upper end of the upper telescopic member 32) and the upper piston 140. Since the upper piston 140 is positioned within an interior of the upper telescopic member 32 and is movable along with the lower telescopic member 36, longitudinally upward displacement of the lower telescopic member 36 causes longitudinally upward displacement of the upper piston 140 relative to the cap assembly 134. This relative longitudinal upward displacement of the upper piston 140 reduces a volume of the positive gas spring 60 that, in turn, causes an increase in resistive force produced by the positive gas spring 60 to resist compression of the suspension 12. It is noted that the upper piston 140 includes a first annular seal (or O-ring) 144 to create a substantially airtight seal between an outer peripheral surface of the upper piston 140 and an inner surface 132*a* of the inner sleeve 132. While not illustrated, the upper piston 140 may also include a bushing interposed between an outer peripheral surface of the upper piston 140 and the inner surface 132*a* of the inner sleeve 132 to enhance slidability of the upper piston 140 within the inner sleeve 132, as well as provide additional sealing characteristics. As will be described in more detail below, the upper piston 140 also includes a piston rod receiving portion 146 and a plurality of additional sealing members 148, 150, and 152.

Accordingly, the negative gas spring 62 is defined between the upper piston 140 and the lower piston 142, which is configured to be longitudinally displaced with longitudinal displacement of the upper telescopic member 32 as the suspension 12 expands and contracts. As such, when the upper telescopic member 32 displaces in a longitudinally downward fashion with respect to the lower telescopic member 36 as the suspension 12 compresses, the lower piston 142 displaces in a longitudinally downward fashion away from the upper piston 140. The negative gas spring 62 serves to assist initial compression of the suspension 12 by, at least, partially counteracting inherent frictional forces of, for instance, various annular seals (e.g., O-rings) or other components of the suspension 12. To this end, an internal chamber defining the negative gas spring 62 may also include a compression spring (e.g., a coil spring) 154, which biases the upper piston 140 towards the cap assembly 134 and, thereby, provides additional spring and damping characteristics to the stroke adjustment unit 28.

Averting primarily to FIG. 12, the lower piston 142 has a lower intermediate portion of substantially a first diameter that includes a first annular seal (or O-ring) 156 to create a substantially airtight seal between an outer peripheral surface of this lower intermediate portion of the lower piston 142 and the inner surface 32*a* of the upper telescopic member 32. The lower piston 142 also has an upper intermediate portion of substantially a second diameter that includes a second annular seal (or O-ring) 158 to create a substantially airtight seal between an outer peripheral surface of this upper intermediate portion of the lower piston 142 and the inner surface 132*a* of the inner sleeve 132. In exemplary embodiments, the first diameter is larger than the second diameter, such that an outer peripheral surface 132*b* of the inner sleeve 132 is radially displaced from the inner peripheral surface 32*a* of the upper telescopic member 32. As will become more apparent below, a radial gap (fluid flow passage) 160 longitudinally extending between the inner sleeve 132 and the upper telescopic member 32 serves as a fluid flow passage 160 that enables fluid communication between the positive and negative gas springs 60 and 62. It is also contemplated that the lower piston 142 may include a bushing (not shown) interposed between an outer peripheral surface of the lower piston 142 and the inner surface 32*a* of the upper telescopic member 32 to enhance slidability of the lower piston 142 within the upper telescopic member 32, as well as provide additional sealing characteristics.

As previously mentioned, the lower piston rod 138 slidably engages with, for example, the inner peripheral surface 142*a* of the lower piston 142. One or more annular seals (or O-rings) 162 and 164 may be utilized to create a substantially airtight seal between the inner peripheral surface 142*a* of the lower piston 142 and an outer peripheral surface 138*b* of the lower piston rod 138. In this manner, a gas chamber 166 may be defined between the lower piston 142 and a bottom end of the lower telescopic member 36 of the stroke adjustment unit 28. The gas chamber 166 may or may not be airtight. An upper portion of the lower piston rod 138 fixedly engages with the piston rod receiving portion 146 of the upper piston 140. The annular sealing member (or O-ring) 152 may be utilized to create a substantially airtight seal between an inner peripheral surface 138*c* of the lower piston rod 138 and a first outer peripheral surface 146*a* of the piston rod receiving portion 146. To this end, the annular sealing member (or O-ring) 150 may be provided between an inner peripheral surface of the upper piston 140 and a second outer peripheral surface 146*b* of the piston rod receiving portion 146 to create a substantially airtight seal therebetween.

Figure 11:
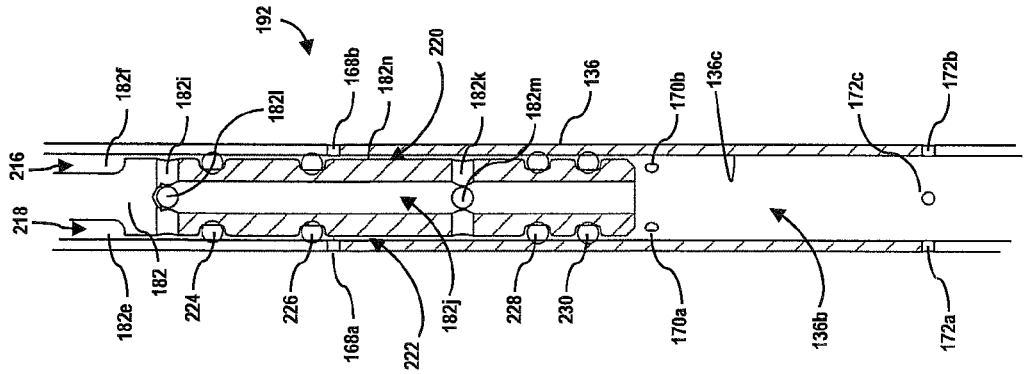
FIG. 11 is an enlarged, longitudinal cross sectional view of a first intermediate portion of the stroke adjustment unit of the adjustable suspension assembly of FIGS. 1-3, according to an exemplary embodiment.

According to exemplary embodiments, a lower end of the upper piston rod 136 slidably engages with an internal bore of the piston rod receiving portion 146. The annular sealing member (or O-ring) 148 may be utilized to create a substantially airtight seal between an inner peripheral surface of the internal bore of the piston rod receiving portion 146 and an outer peripheral surface 136*a* of the upper piston rod 136. A lower distal end portion of the upper piston rod 136 may extend into hollow interior region 138*a* of the lower piston rod 138. In this manner, a hollow interior region 136*b* of the upper piston rod 136 is in fluid communication with the hollow interior region 138*a* of the lower piston rod 138. It is noted that the upper piston rod 136 includes a plurality of flow ports, such as flow ports 168a, 168b, 170a, 170b, 172a, 172b, and 172c, which enable fluid communication between the hollow interior region 136b and the positive gas spring 60, as can be seen in FIG. 11. In this manner, the gas fill valve 66 may be utilized to pressurize the positive gas spring 60 with any suitable gas (e.g., air) via a flow passage defined by the conjunction of the hollow interior region 138a, the hollow interior region 136b, and the flow ports 168a, 168b, 170a, 170b, 172a, 172b, and 172c. As will become more apparent below, since the positive gas spring 60 may have selectively fluid communication with the negative gas spring 62, the gas fill valve 66 may also be utilized to pressurize the negative gas spring 62.

The lower piston 142 also includes a plurality of directional valves (e.g., one-way valves, such as back-flow flaps, that may be spring-biased) 174 and 176 respectively enabling opposing directional flows of gas into and out of the negative gas spring 62. In this manner, the directional valves 174 and 176 fluidly communicate with corresponding fluid flow passages 178 and 180 that fluidly communicate with the fluid flow passage 160 that enables fluid communication between the positive and negative gas springs 60 and 62 via the cap assembly 134 and the upper piston rod 136, as will become more apparent below.

Figure 10:
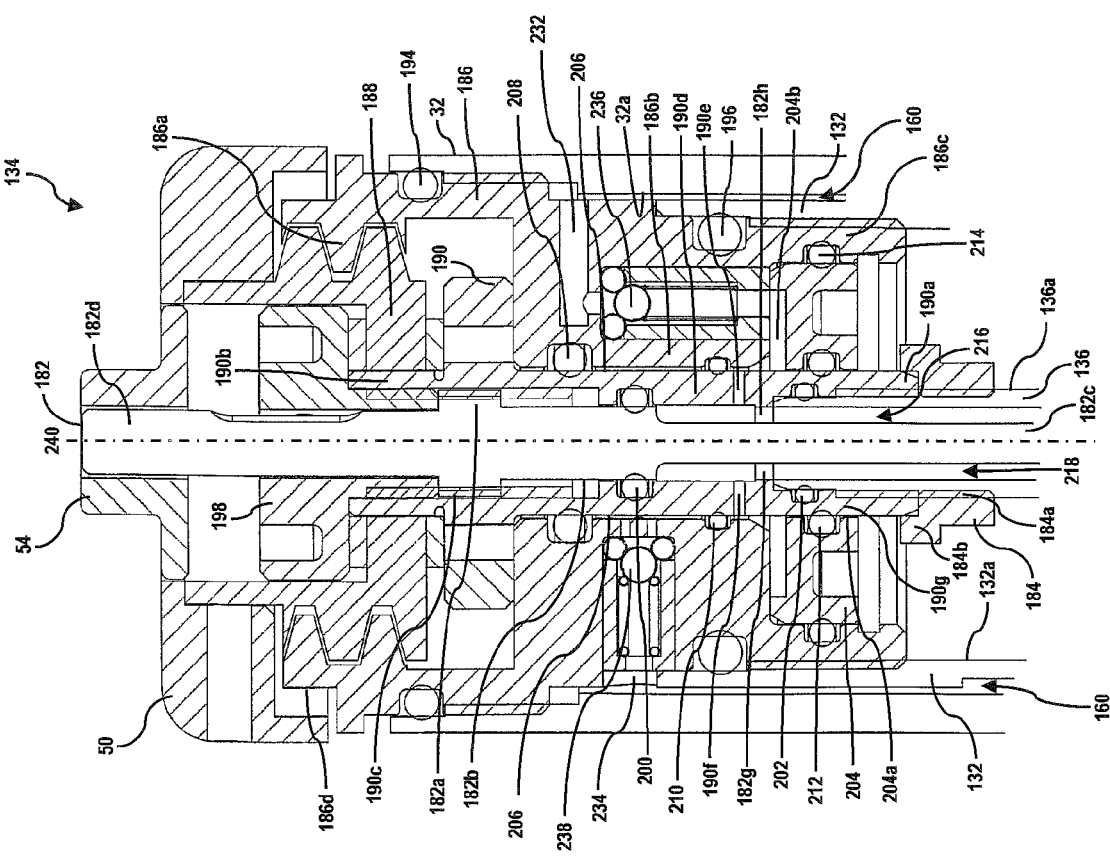
FIG. 10 is an enlarged, longitudinal cross sectional view of an upper portion of a stroke adjustment unit of the adjustable suspension assembly of FIGS. 1-3, according to an exemplary embodiment.

Averting primarily to FIG. 10, the cap assembly 134 includes, in exemplary embodiments, the first adjustment actuator 50, the second adjustment actuator 54, an adjustment shaft 182, an upper support member 184, an upper body member 186, an upper movement mechanism 188, and a lower movement mechanism 190. The first adjustment actuator 50 and the upper movement mechanism 188 cooperate to form a coarse stroke adjustment mechanism that effectively enables the shock absorber unit 28 to be adjusted between a first operating state having, for example, a relatively "long" stroke length and a second operating state having, for instance, a relatively "short" stroke length. The second adjustment actuator 54, the adjustment shaft 182, and the lower movement mechanism 190 cooperate to form a fine stroke adjustment mechanism that effectively enables the shock absorber unit 28 to be adjustment between the second operating state having the relatively "short" stroke length and a plurality of other operating states, such as a third operating state and a fourth operating state. In this manner, the other operating states have progressively "longer" stroke lengths than the relatively "short" stroke length of the second operating state, but "shorter" stroke lengths than the relatively "long" stroke length of the first operating state. For instance, the third operating state may have a relatively "longer" stroke length than the second operating state, but a relatively "shorter" stroke length than the first operating state, whereas the fourth operating state may have a relatively "longer" stroke length than the third operating state, but a relatively "shorter" stroke length than the first operating state. It is noted that a fine stroke adjustment unit 192 (FIG. 11) is formed from (or coupled to) a lower portion of the adjustment shaft 182 to effectuate stroke adjustments between the second operating state and the other operating states, such as the third and fourth operating states.

The upper support member 184 includes a stepped center bore having a lower bore portion 184a with an internal thread and an upper bore portion 184b with an internal thread, where the upper bore portion 184b has a respectively larger diameter than the diameter of the lower bore portion 184a. The upper support member 184 is threaded onto a lower portion 190a of the movement mechanism 190 having a respectively threaded external surface to threadedly engage with the upper bore portion 184b. The lower bore portion 184a is threaded onto the upper piston rod 136 having a respectively threaded external surface to threadedly engage with the lower bore portion 184a. In this manner, the upper bore portion 184b of the upper support member 184 rotatably supports part of the lower movement mechanism 190 and serves as an effective "stopper," to regulate actuation of the first adjustment actuator 50, as will become more apparent below.

According to exemplary embodiments, the upper body member 186 is threaded into an upper end of the upper telescopic member 32 with an annular seal (or O-ring) 194 (FIG. 10) disposed between an outer peripheral surface of the upper body member 186 and the internal surface 32a of the upper telescopic member 32 so as to create a seal therebetween. The upper body member 186 is also threaded into an upper end of the inner sleeve 132 with an annular seal (or O-ring) 196 (FIG. 10) disposed between an outer peripheral surface of the upper body member 186 and the internal surface 132a of the inner sleeve 132 so as to create a seal therebetween. Additionally, the upper body member 186 includes a stepped center bore with an upper bore portion 186a including an internal thread, a middle bore portion 186b, and a lower bore portion 186c. The upper body member 186 also has an annular recess 186d in an upper surface with annular recess 186d coaxially surrounding upper bore portion 186a. In this manner, the upper bore portion 186a and an annular recess 186d form an upper shaft portion having an internal thread that threadedly receives the upper movement mechanism 188 coupled to the first adjustment actuator 50.

The lower movement mechanism 190 has a stepped internal bore with an upper bore portion 190b including an internal thread, a first intermediate bore portion 190c including an internal thread, a second intermediate bore portion 190d including a plurality of fluid flow ports 190e and 190f, and a lower bore portion 190a including an internal thread. In this manner, the upper bore portion 190b threadedly engages with an internal thread of a bore portion of an upper stopper 198, the first intermediate bore portion 190c threadedly engages with a correspondingly threaded portion 182a of the adjustment shaft 182, and the lower bore portion 190a threadedly engages with an external surface of the upper piston rod 136 having a respectively threaded surface to threadedly engage with the lower bore portion 190a. The lower movement mechanism 190 also includes an annular seal (or O-ring) 200 disposed between an internal peripheral surface of the second intermediate bore portion 190d and an external surface 182b of the adjustment shaft 182 so as to create a seal therebetween. An annular seal (or O-ring) 202 may be disposed between an internal peripheral surface of a third intermediate bore portion 190g of the lower movement mechanism 190 and the outer peripheral surface 136a of the upper piston rod 136 so as to create a seal therebetween.

As seen in FIG. 10, the lower movement mechanism 190 is slidably coupled to the upper body member 186. It is noted that a spacing member 204 is disposed within an interior region of the lower bore portion 186c such that an external surface of the spacing member 204 abuts an internal surface of the lower bore portion 186c of the upper body member 186. Further, an internal surface 204a of a first central bore of the spacing member 204 abuts an external surface of the lower movement mechanism 190 that coaxially surrounds the third intermediate bore portion 190g. In this manner, the spacing member 204 enables reliable, axial spacing between an inner surface of the middle bore portion 186b of the upper body member 186 and an outer surface coaxially surrounding the second intermediate bore portion 190d of the lower movement mechanism 190. This axial spacing enables a longitudinally extending fluid flow passage 206 to be established.

According to exemplary embodiments, an annular seal (or O-ring) 208 is disposed between an external peripheral surface coaxially surrounding the second intermediate bore portion 190d of the lower movement mechanism 190 and an internal surface of the upper body member 186 so as to create a seal therebetween. Another annular seal (or O-ring) 210 is disposed between an external peripheral surface of the second intermediate bore portion 190d of the lower movement mechanism 190 and an internal surface of the upper body member 186 so as to create a seal therebetween. A further annular seal (or O-ring) 212 is disposed between an external peripheral surface of the intermediate bore portion 190g of the lower movement mechanism 190 and an internal surface of the spacing mechanism 204 so as to create a seal therebetween. In this manner, the fluid flow passage 206 may be configured to longitudinally extend from, at least, the annular seal 208 to the annular seal 212, such that fluid flow passages may fluidly communicate with the fluid flow ports 190e and 190f of the lower movement mechanism 190 and a second bore region 204b formed to an upper portion of the spacing member 204 that effectively serves as a fluid flow passage. As will become more apparent below, the longitudinal positioning of the annular seal 210 with respect to the fluid flow ports 190e and 190f serves to selectively control a directional flow of gas from the positive gas spring 60 to the negative gas spring 62, or vice versa. It is also noted that an annular seal (or O-ring) 214 may be disposed between an external peripheral surface of the spacing member 204 and an internal surface of the lower bore portion 186c of the upper body member 186 so as to create a seal therebetween.

Referring to both FIGS. 10 and 11, the adjustment shaft 182 includes an intermediate shaft portion 182c of a smaller diameter than a diameter corresponding to an upper shaft portion 182d and, thereby, includes recessed regions 182e and 182f. The recessed regions 182e and 182f longitudinally extend into the hollow interior region 136b of the upper piston rod 136 and, as a result, define fluid flow passages 216 and 218 that longitudinally extend from fluid flow ports 182g and 182h of the adjustment shaft 182 into a radial, upper fluid flow passage 182i of the adjustment shaft 182 that branches into a longitudinal, fluid flow passage 182j. In turn, the longitudinal fluid flow passage 182j branches into a radial, lower fluid flow passage 182k and also fluidly communicates with the interior hollow region 136b of the upper piston rod 136. The adjustment shaft 182 may also include fluid flow ports 182l and 182m.

According to exemplary embodiments, an outer peripheral surface 182n of a lower portion of the adjustment shaft 182 has a relatively larger diameter than the diameter of the intermediate shaft portion 182c of the adjustment shaft 182. It is noted that a diameter of an inner surface 136c of the upper piston rod 136 is of a relatively larger diameter than the diameter of the outer peripheral surface 182n of the adjustment shaft 182. In this manner, the outer peripheral surface 182n of the adjustment shaft 182 may be radially spaced from the inner surface 136c of the upper piston rod 136. It is noted that the upper piston rod 136 and the adjustment shaft 182 may be coaxially aligned. In any event, however, this radial spacing between the upper piston rod 136 and the adjustment shaft 182 extends longitudinally and, thereby, defines fluid flow passages 220 and 222. A plurality of annular seals (or O-rings), such as annular seals 224, 226, 228, and 230, may be disposed between the outer peripheral surface 182n of the adjustment shaft 182 and the internal surface 136c of the upper piston rod 136 so as to create corresponding seals therebetween. Longitudinal positioning of annular seals 224, 226, 228, and 230 may be configured so that when the adjustment shaft 182 is longitudinally disposed within the upper piston rod 136, fluid flow from (or to) the fluid flow passages 216 and 218 to (or from) the positive gas spring 60 via, for instance, one or more of the flow ports 168a, 168b, 170a, 170b, 172a, 172b, and 172c, as well as the fluid flow passages 182i, 182j, 182k, 220, and 222 may be selectively regulated to control a stroke length of the shock absorber unit 28, as will become more apparent below.

Averting back to FIG. 10, the upper body member 186 may also include fluid flow passages 232 and 234, as well as directional valves (e.g., one-way valves, such as back-flow flaps, that may be spring-biased) 236 and 238. The fluid flow passage 232 enables fluid communication between the fluid flow passage 160 and the directional valve 236, whereas the fluid flow passage 234 enables fluid communication between the fluid flow passage 160 and the directional valve 238. In this manner, the directional valves 236 and 238 control gas flow between the positive and negative gas springs 60 and 62, as will become more apparent below.

In exemplary embodiments, the second adjustment actuator 54 is rigidly coupled to the upper shaft portion 182d of the adjustment shaft 182, such that rotational movement of the second adjustment actuator 54 about an axis of rotation 240 causes corresponding rotational motion of the adjustment shaft 182. Due to the corresponding threaded portions 182a of the adjustment shaft 182 and an internal thread of the first intermediate bore portion 190c of the lower movement mechanism 190, rotational motion of the adjustment shaft 182 about the axis of rotation 240 can be translated into a longitudinal displacement of a lower distal end of adjustment shaft within the hollow interior region 136b of the upper piston rod 136. In a similar fashion, the first adjustment actuator 50 is rigidly coupled to the upper movement mechanism 188, such that rotational movement of the first adjustment actuator 50 about the axis of rotation 240 causes corresponding rotational motion of the upper movement mechanism 188. Due to corresponding threaded portions of the upper bore portion 186a of the upper body member 186 and a lower threaded portion of the upper movement mechanism 188, rotational motion of the upper movement mechanism 188 about the axis of rotation 240 can be translated into a longitudinal displacement of the lower movement mechanism 190 and, thereby, of the fluid flow ports 190e and 190f with respect to the annular seal 210.

As previously mentioned, actuation of the adjustment actuator 50 provides coarse control over adjustment settings of a stroke length, such as between a relatively "long" stroke length and a relatively "short" stroke length. In this manner, actuation of the adjustment actuator 54 provides finer control over adjustment settings of the stroke length, such as between the "short" stroke length and a plurality of other "short" stroke lengths that are relatively "shorter" than the relatively "long" stroke length, but relatively "longer" than the relatively "short" stroke length.

Figure 13:
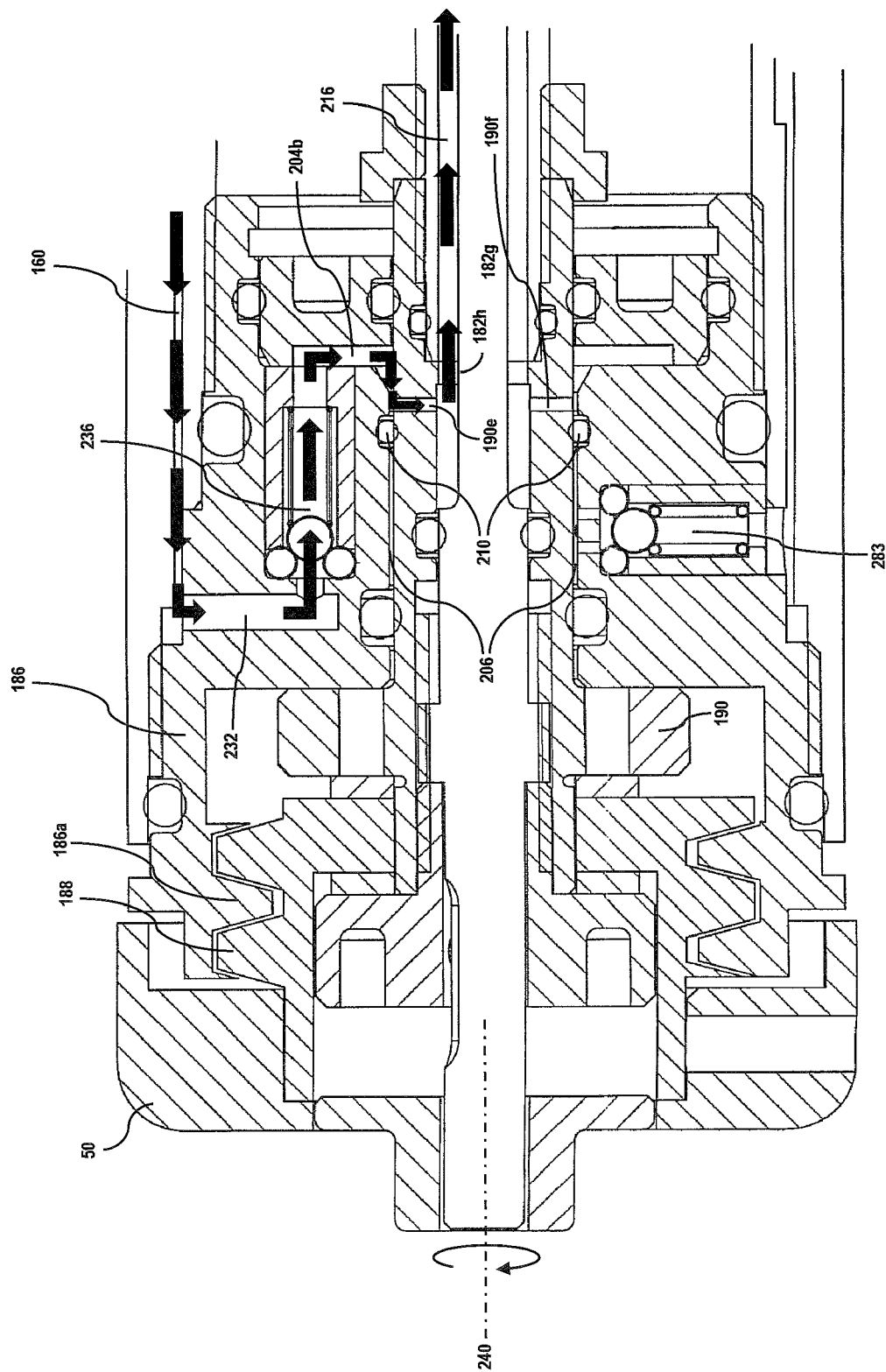
FIGS. 13-15 are enlarged, longitudinal cross sectional views of the various portions of the stroke adjustment unit of FIGS. 10-12 in a "long" stroke operating state, according to an exemplary embodiment.
Figure 14:
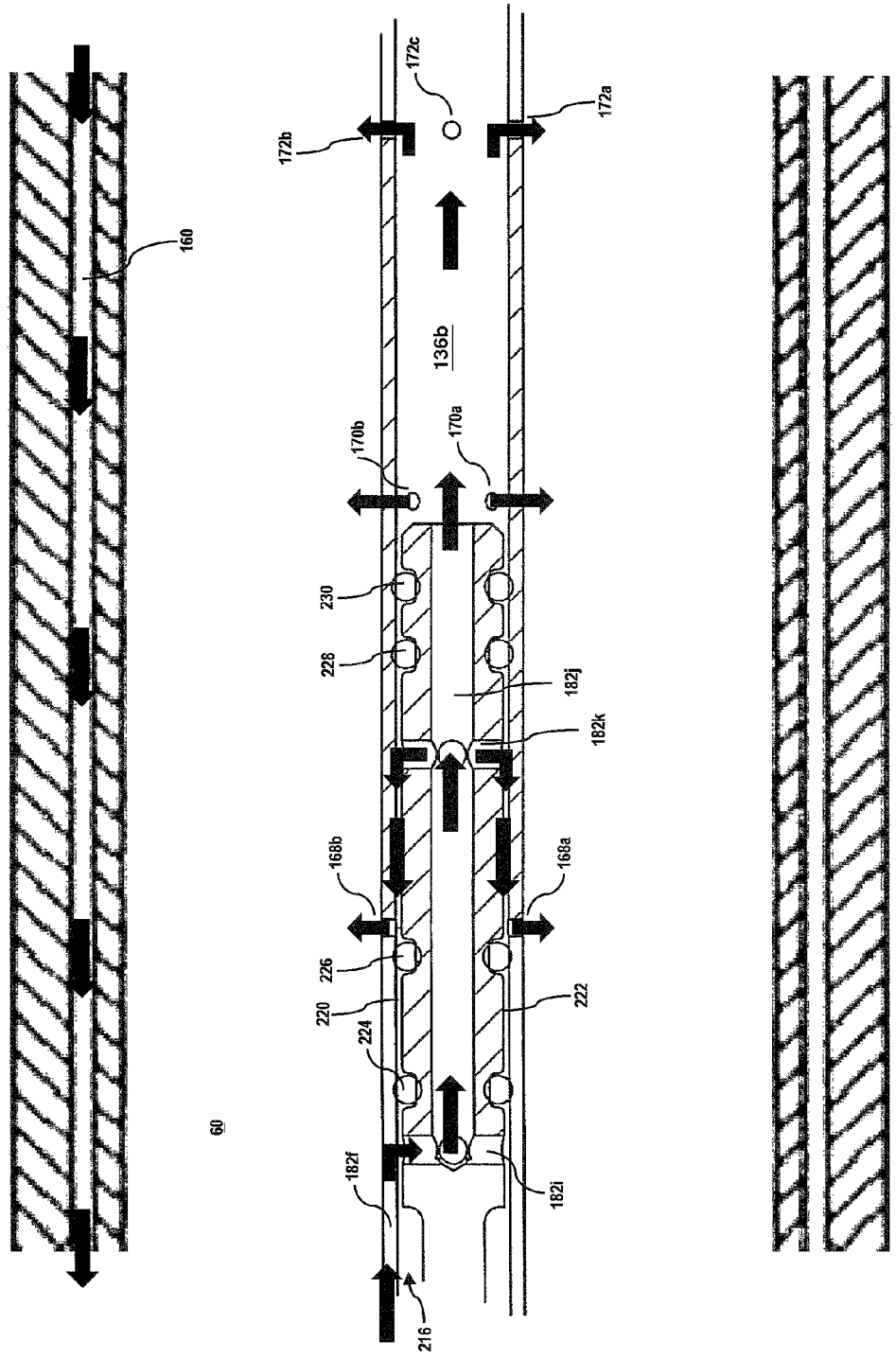
Figure 15:
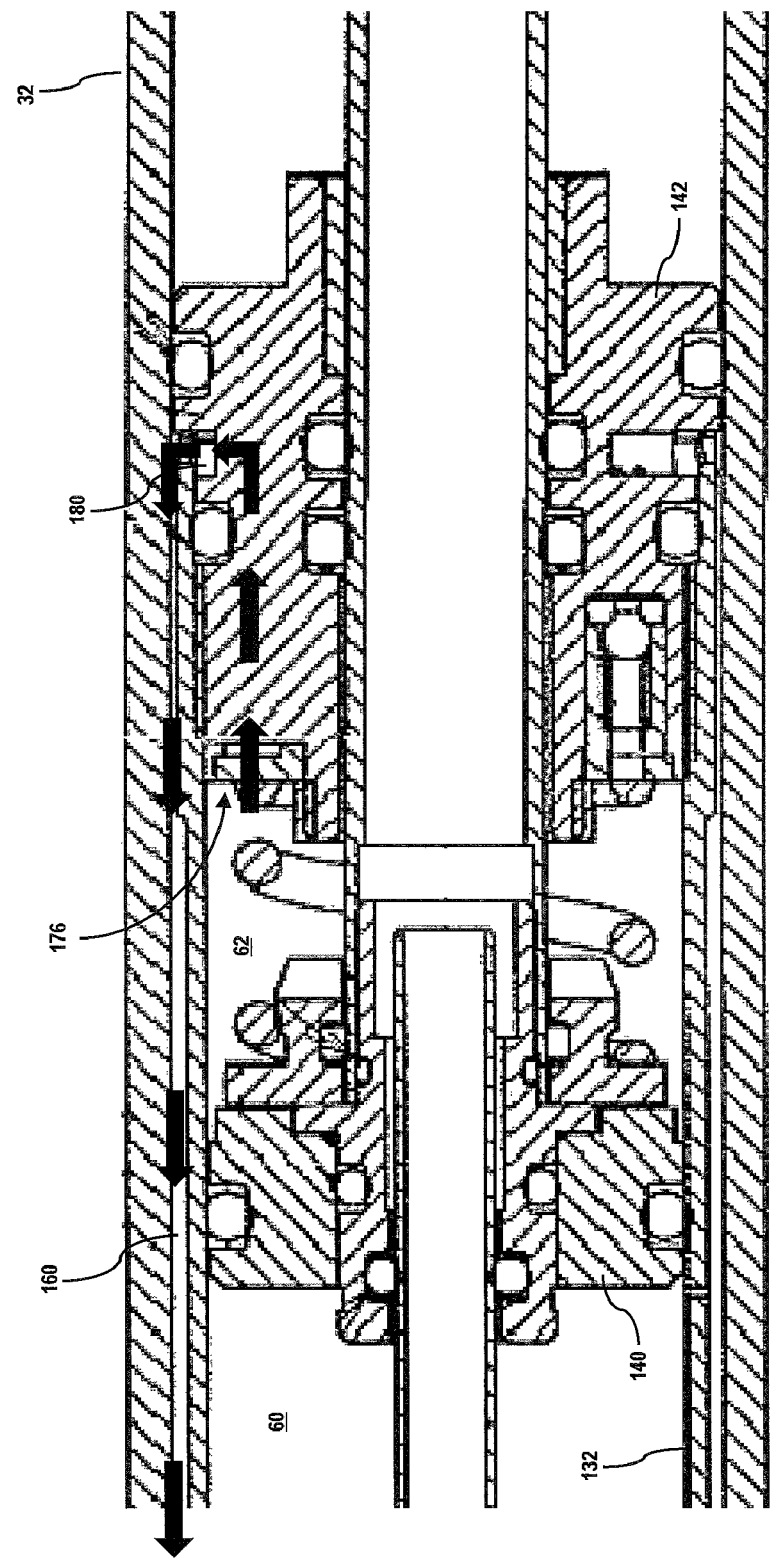

FIGS. 13-15 are enlarged, longitudinal cross sectional views of the various portions of the stroke adjustment unit 28 being actuated to a first (or a relatively "long" stroke length) operating state. In this manner, the first adjustment actuator 50 is actuated (e.g., rotated) about the axis of rotation 240, such as in a clockwise fashion. Rotational motion of the first adjustment actuator 50 causes the upper movement mechanism 188 to also rotate about the axis of rotation 240. As previously mentioned, due to the threaded engagement of corresponding threaded portions of the upper bore portion 186a of the upper body member 186 and a lower threaded portion of the upper movement mechanism 188, the aforementioned rotational motion translates into a longitudinal displacement of the upper movement mechanism 188 and the lower movement mechanism 190 towards the lower telescopic member 36 of the shock absorber unit 28 and, thereby, longitudinally displaces the positioning of the fluid flow ports 190*e* and 190*f* with respect to the annular seal 210.

According to exemplary embodiments, a relatively "long" stroke length operating state entails the fluid flow ports 190*e* and 190*f* being longitudinally displaced "lower" than the annular seal 210, such that the annular seal 210 blocks fluid flow into a directional valve 283 via the fluid flow passage 206. Instead, the annular seal 210 enables fluid flow from the fluid flow passage 160 to traverse the fluid flow passage 232, the directional valve 236, the fluid passage 204*b*, the fluid flow passage 206, the fluid flow port 190*e*, the fluid flow port 182*h*, and the fluid flow passage 216. It is noted that since the directional flow of gas is from the negative gas spring 62 into the positive gas spring 60, gas from the negative gas spring 62 may traverse the directional valve 176 and the fluid flow passage 180 to, thereby, enter the fluid flow passage 160. At any rate, gas entering the fluid flow passage 216 be directionally diverted into the positive gas spring 60 via the fluid flow passage 182*f*, the fluid flow passage 182*i*, the fluid flow passage 182*k*, the fluid flow passage 220, and the hollow interior region 136*b* of the upper piston rod 136. Since the annular seals 224 and 226 are disposed relatively "higher" than the flow ports 168*a* and 168*b*, gas flow traverses into the positive gas spring 60 from the fluid flow passage 182*j*, the fluid flow passage 182*k*, the fluid flow passages 220 and 222, and the fluid flow ports 168*a* and 168*b*. Further, since the annular seals 228 and 230 are disposed relatively "higher" than the fluid flow ports 170*a*, 170*b*, 172*a*, 172*b*, and 172*c*, gas flow may traverse into the positive gas spring 60 from the fluid flow passage 182*j*, and the fluid flow ports 170*a*, 170*b*, 172*a*, 172*b*, and 172*c*.

Figure 16:
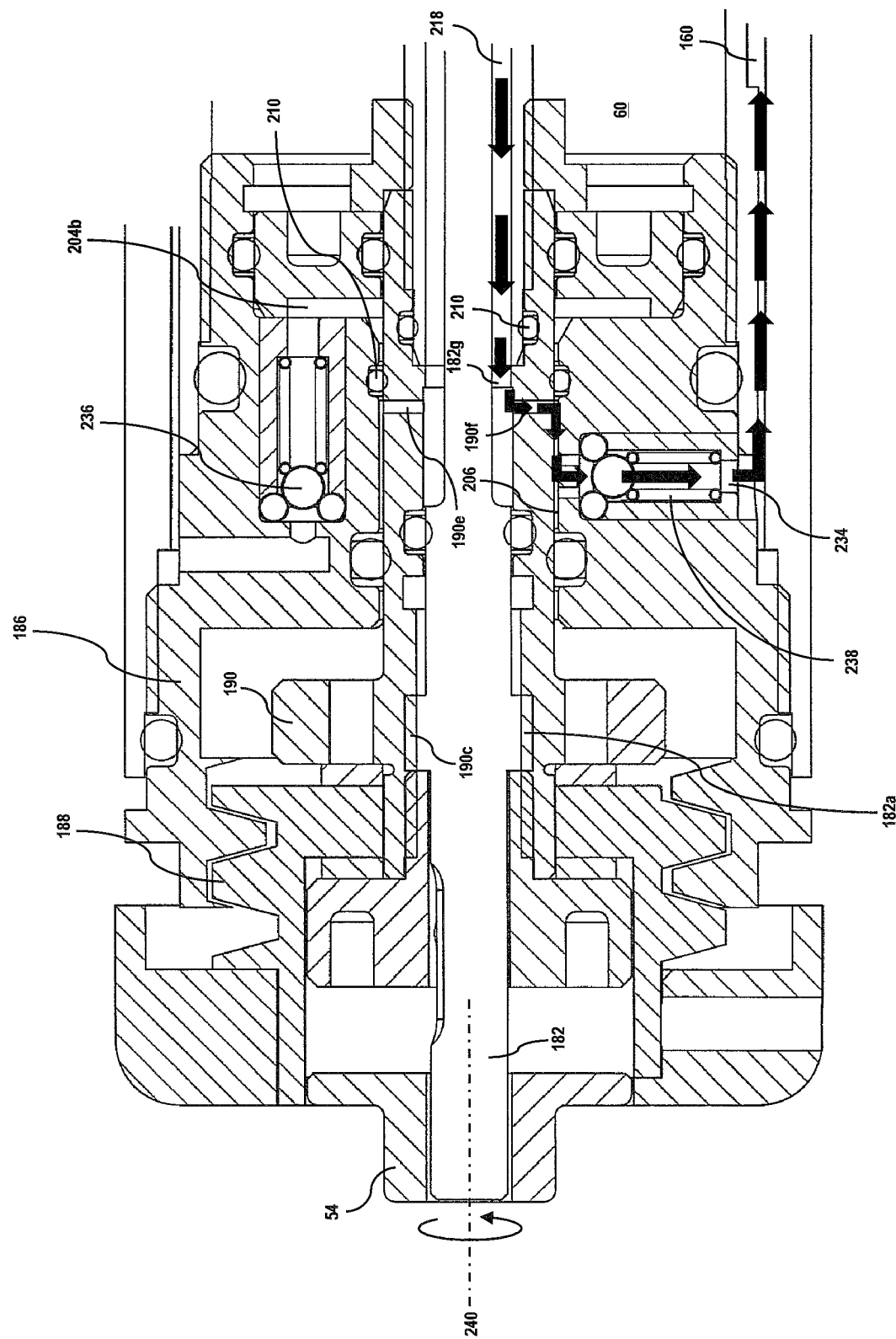
FIGS. 16-18 are enlarged, longitudinal cross sectional views of the various portions of the stroke adjustment unit of FIGS. 10-12 in a "short" stroke operating state, according to an exemplary embodiment.
Figure 17:
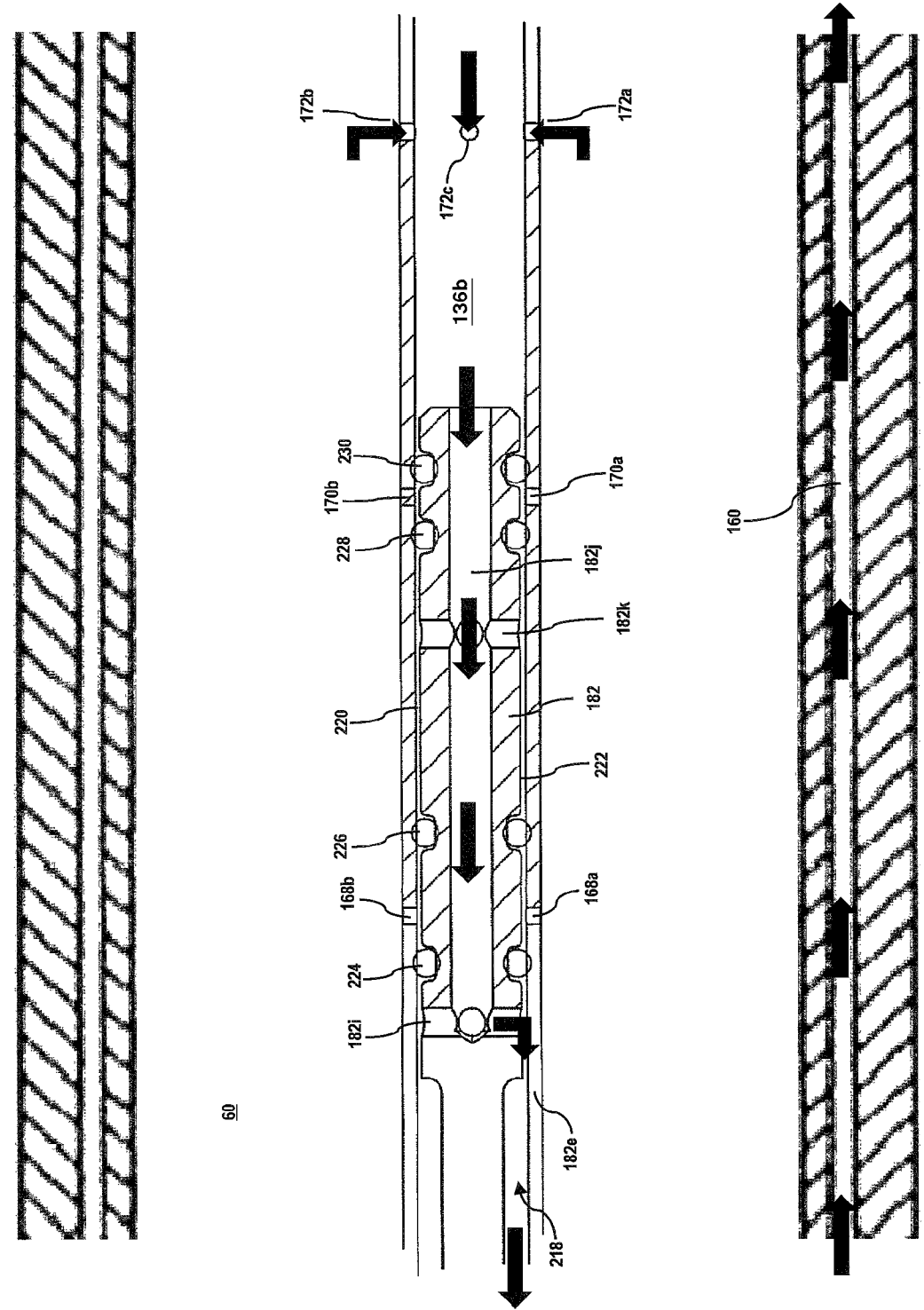
Figure 18:
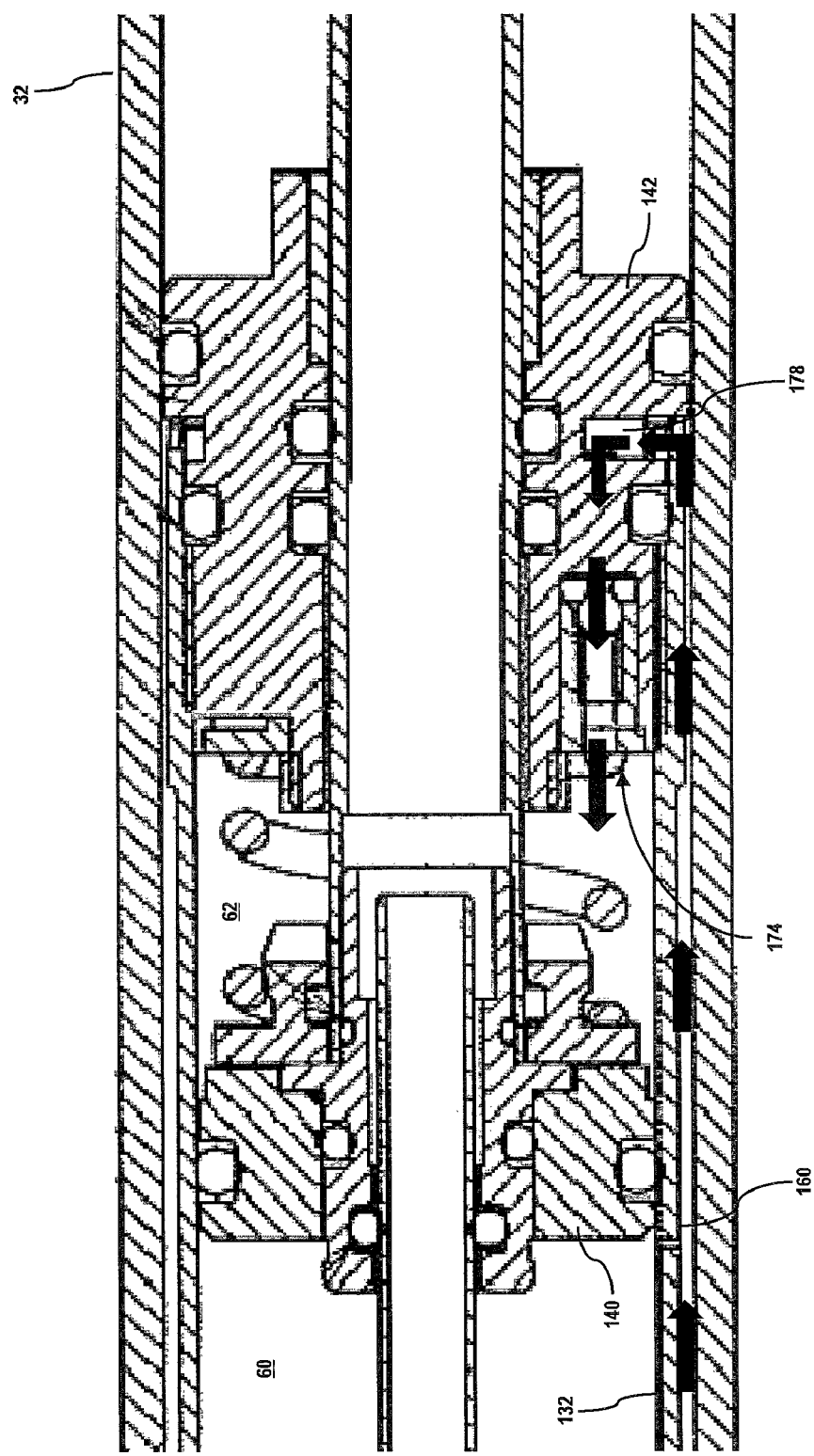

FIGS. 16-18 are enlarged, longitudinal cross sectional views of the various portions of the stroke adjustment unit 28 being actuated to a second (or a relatively "short" stroke length) operating state. In this manner, the first adjustment actuator 50 is actuated (e.g., rotated) about the axis of rotation 240, such as in a counterclockwise fashion. Rotational motion of the first adjustment actuator 50 causes the upper movement mechanism 188 to also rotate about the axis of rotation 240. As previously mentioned, due to the threaded engagement of corresponding threaded portions of the upper bore portion 186*a* of the upper body member 186 and a lower threaded portion of the upper movement mechanism 188, the aforementioned rotational motion translates into a longitudinal displacement of the upper movement mechanism 188 and the lower movement mechanism 190 towards the cap assembly 134 of the shock absorber unit 28 and, thereby, longitudinally displaces the positioning of the fluid flow ports 190*e* and 190*f* with respect to the annular seal 210.

According to exemplary embodiments, a relatively "short" stroke length operating state entails the fluid flow ports 190*e* and 190*f* being longitudinally displaced "higher" than the annular seal 210, such that the annular seal 210 blocks fluid flow from the directional valve 236 into the flow port 190*e*. Instead, the annular seal 210 enables fluid flow the fluid flow passage 218 to traverse the flow port 182*g*, the flow port 190*f*, the fluid flow passage 206, the directional valve 238, and the fluid flow passage 160. It is noted that since the directional flow of gas is from the positive gas spring 60 into the negative gas spring 62, gas from the positive gas spring 60 may traverse the fluid flow passage 182*e* into the fluid flow passage 218 and, thereby, traverse the aforementioned fluid flow passages and flow ports to the fluid flow passage 160. In this manner, the directional flow of gas from the fluid flow passage 160 enters the fluid flow passage 178, the directional valve 174 and, thereby, enters the negative gas spring 62.

Referring to FIG. 17, in the relatively "short" operating state, the adjustment shaft 182 is disposed as far within the hollow interior region 136*b* of the upper piston rod 136 as permitted. In this manner, gas from the positive gas spring 60 may only enter the hollow interior region 136*b* from the flow ports 172*a*, 172*b*, and 172*c*. This is due to the fact that the flow ports 170*a* and 170*b* are sealed off by (e.g., disposed between) the annular seals 228 and 230. Thus, gas flowing into the fluid flow ports 170*a* and 170*b* cannot enter the fluid flow passages 182*i* or 182*k* because the annular seal 228 prevents such fluid communication, nor can this gas enter the fluid flow passage 182*j* because the annular seal 230 prevents such fluid communication. In a similar fashion, the fluid flow ports 168*a* and 168*b* are sealed off by (e.g., disposed between) the annular seals 224 and 226. As such, gas flowing into the fluid flow ports 168*a* and 168*b* cannot enter the fluid flow passage 182*i* because the annular seal 224 prevents such fluid communication, nor can this gas enter the fluid flow passage 182*k* or 182*j* because the annular seal 226 prevents such fluid communication. Accordingly, only fluid from the flow ports 172*a*-172*c* enters the fluid flow passage 182*j*, traverses the fluid flow passage 182*i*, and enters the fluid flow passage 218 en route to the flow port 182*g*. Since the longitudinal positioning of the adjustment shaft 182 creates a "smallest" volume state for the positive gas spring 60, a gas pressure increases in the positive gas spring 60, such that more gas is forced into the negative gas spring 62. An increased pressure in the negative gas spring 62 causes negative gas spring to expand and, thereby, shorten a "stroke" length of the shock absorber unit 28.

In order to provide selectively longer stroke lengths than the second operating state, but relatively shorter than the first operating state, the second adjustment actuator 54 may be actuated (e.g., rotated) about the axis of rotation 240, such as in a counterclockwise fashion. Since the second adjustment actuator 54 is rigidly coupled to the upper shaft portion 182*d* of the adjustment shaft 182, rotational movement of the second adjustment actuator 54 about the axis of rotation 240 causes the adjustment shaft 182 to also rotate about the axis of rotation 240. As previously mentioned, due to the corresponding threaded portions 182*a* of the adjustment shaft 182 and an internal thread of the first intermediate bore portion 190*c* of the lower movement mechanism 190, rotational motion of the adjustment shaft 182 about the axis of rotation 240 longitudinally draws a lower distal end of the adjustment shaft 182 relatively higher from the longitudinal position of the lower distal end in the second operating.

Figure 19B:
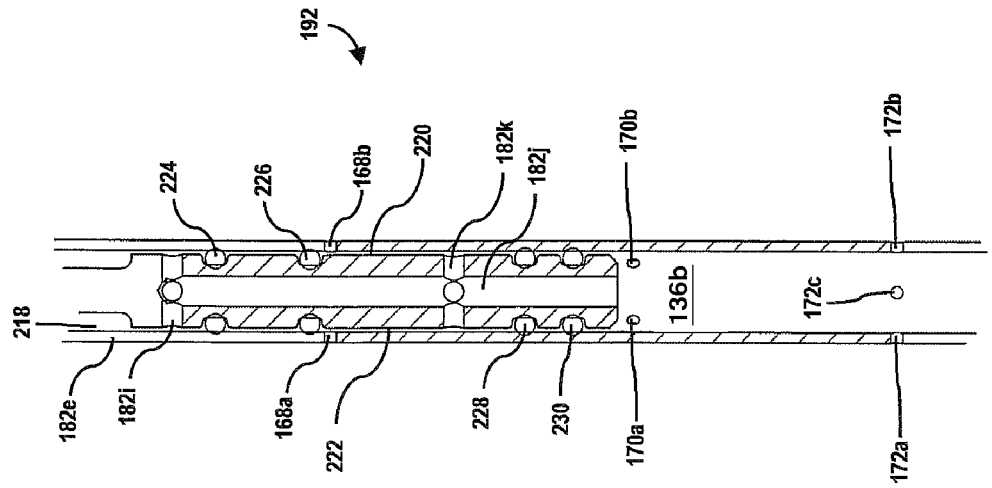
FIGS. 19A and 19B are enlarged, longitudinal cross sectional views of the second intermediate portion of FIG. 11 in varying "short" stroke operating states, according to exemplary embodiments.
Figure 19A:
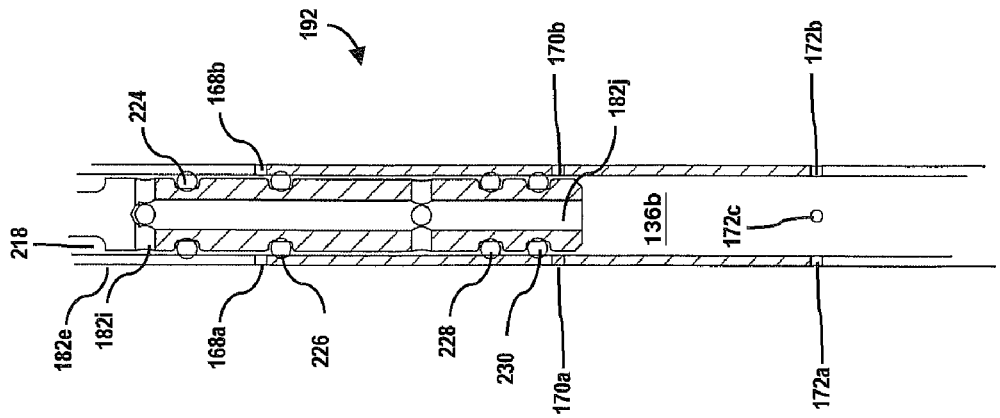

FIGS. 19A and 19B are enlarged, longitudinal cross sectional views of the fine stroke adjustment unit 192 in varyingly "longer," relatively "short" stroke length operating states. As seen in FIG. 19A, a third operating state is illustrated, wherein a progressively "longer" stroke length than the second operating state is illustrated. As shown, a longitudinal position of the adjustment shaft 182 is controlled by the second adjustment actuator 54, such that gas from the positive gas spring 60 may enter the interior hollow region 136*b* of the upper piston rod 136 via the flow ports 170*a*, 170*b*, 172*a*, 172*b*, and 172*c*. This occurs because the annular seals 224, 226, 228, and 230 are all longitudinally disposed "higher" than the flow ports 170*a*, 170*b*, 172*a*, 172*b*, and 172*c*. As such, the gas entering ports 170*a*, 170*b*, 172*a*, 172*b*, and 172*c* may traverse the fluid flow passage 182*j*, the fluid flow passage 182*i*, and the fluid flow passage 182*e* and, thereby, enter the fluid flow passage 218 in route to the flow port 182*g*. Because a relatively "larger" volume is provided for the positive gas spring 60, less pressure is realized and, thereby, less gas is forced into the negative gas spring 62.

Accordingly, in FIG. 19B a fourth operating state is shown, wherein a progressively "longer" stroke length than the third operating state is illustrated. In this embodiment, a longitudinal position of the adjustment shaft 182 is controlled by the second adjustment actuator 54, such that gas from the positive gas spring 60 may enter the interior hollow region 136b of the upper piston rod 136 via the flow ports 168a, 168b, 170a, 170b, 172a, 172b, and 172c. This occurs because the annular seals 224 and 226 are longitudinally disposed higher than the flow ports 168a and 168b and, as such, gas from the positive gas spring 60 flows into the flow ports 168a and 168b, traverses the fluid flow passages 220 and 222, the fluid flow passage 182j, the fluid flow passage 182i, the fluid flow passage 182e, to, thereby, enter the fluid flow passage 218 in route to the flow port 182g. In a similar fashion, because the annular seals 228 and 230 are longitudinally disposed "higher" than the flow ports 170a, 170b, 172a, 172b, and 172c, gas entering the ports 170a, 170b, 172a, 172b, and 172c may traverse the fluid flow passage 182j, the fluid flow passage 182i, the fluid flow passage 182e and, thereby, enter the fluid flow passage 218 in route to the flow port 182g. Because a relatively "larger" volume is provided for the positive gas spring 60, less pressure is realized and, thereby, less gas is forced into the negative gas spring 62.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. An adjustable bicycle suspension system comprising:
a first stroke adjustment unit configured to adjust a stroke length of a suspension by changing a position of the suspension at a first position or a second position; and
a second stroke adjustment unit configured to adjust the stroke length of the suspension by changing the position of the suspension at the second position but not in the first position,
wherein the bicycle suspension system is configured to provide a coarse stroke adjustment between a long stroke length and a short stroke length, and
wherein the bicycle suspension system is configured to provide a fine stroke adjustment that adjusts to a plurality of stroke lengths between the long stroke length and the short stroke length.

2. An adjustable bicycle suspension system comprising:
a first stroke adjustment unit configured to adjust a stroke of a suspension by changing a position of the suspension at a first position or a second position;
a second stroke adjustment unit configured to change the position of the suspension at the second position independently from the first position;
an outer tube having a first end and a second end;
a first inner tube having a first end and a second end, the first end of the first inner tube being provided with the first stroke adjustment unit and the second stroke adjustment unit, and the second end of the first inner tube being telescopically received in the first end of the outer tube;
a second inner tube having a first end and a second end, the second inner tube being disposed within the first inner tube; and
a first piston assembly slidably coupled in the second inner tube to sealingly separate a positive gas spring from a negative gas spring.

3. The adjustable bicycle suspension system according to claim 2, further comprising:
a second piston assembly coupled to the second end of the second inner tube and slidably coupled in the first inner tube to sealingly separate the negative gas spring from a flow passage longitudinally extending between an inner surface of the first inner tube and an outer surface of the second inner tube.

4. The adjustable bicycle suspension system according to claim 3, wherein the second piston assembly includes:
a first directional flow valve configured to selectively permit gas from the flow passage to flow into the negative gas spring; and
a second directional flow valve configured to selectively permit gas from the negative gas spring to flow into the flow passage,
wherein the pressure differentials between the positive gas spring and the negative gas spring controlled by the second stroke adjustment unit cause a directional flow of gas through either the first directional flow valve or the second directional flow valve to adjust the stroke of the bicycle suspension system.

5. The adjustable bicycle suspension system according to claim 4, further comprising:
a capping member rigidly coupled to the first end of the first inner tube and rigidly coupled to the first end of the second inner tube to sealingly separate the positive gas spring from the flow passage.

6. The adjustable bicycle suspension system according to claim 5, wherein the capping member includes:
a third directional flow valve configured to selectively permit gas from the positive gas spring to flow into the flow passage; and
a fourth directional flow valve configured to selectively permit gas from the flow passage to flow into the positive gas spring,
wherein the pressure differentials between the positive gas spring and the negative gas spring controlled by the second stroke adjustment unit cause the directional flow of gas through either the third directional flow valve or the fourth directional flow valve to adjust the stroke of the bicycle suspension system.

7. The adjustable bicycle suspension system according to claim 6, wherein the bicycle suspension system is configured to a first state when the directional flow of gas is through the second and fourth directional flow valves and is configured to one of a plurality of second states when the directional flow of gas is through the first and third directional flow valves.

8. The adjustable bicycle suspension system according to claim 7, wherein the first state corresponds to a relatively long stroke length and the plurality of second states correspond to a plurality of relatively progressive shorter stroke lengths.

9. The adjustable bicycle suspension system according to claim 6, wherein the second stroke adjustment unit includes an adjustment actuator engaged with a mechanism configured to selectively block directional flow of gas to the third directional flow valve from the positive gas spring or directional flow of gas to the positive gas spring from the fourth directional flow valve.

10. The adjustable bicycle suspension system according to claim 2, further comprising:
a piston rod including a first hollow interior and a first end configured to support the first piston thereon; and
a shaft rod including a second hollow interior, a second end configured to permit fluid communication between the first hollow interior and the second hollow interior, and a plurality of flow ports configured to permit fluid communication between the second hollow interior and the positive gas spring, wherein a shaft of the stroke adjustment unit extends longitudinally into the second hollow interior to selectively block fluid communication of one or more of the plurality of flow ports to adjust the stroke of the gas spring suspension system.

11. The adjustable bicycle suspension system according to claim 10, wherein the stroke adjustment unit includes an adjustment actuator configured to control extension of the shaft into the second hollow interior between a plurality of longitudinal positions that correspond to a plurality of stroke length adjustments of the bicycle suspension system.

* * * * *